United States Patent
Kim et al.

(10) Patent No.: US 10,798,765 B2
(45) Date of Patent: *Oct. 6, 2020

(54) METHOD USING A TIME POINT FOR SHARING DATA BETWEEN ELECTRONIC DEVICES BASED ON SITUATION INFORMATION

(71) Applicant: Samsung Electronics Co., Ltd., Gyeonggi-do (KR)

(72) Inventors: A-Ram Kim, Gyeonggi-do (KR); Hyung-Min Kim, Gyeonggi-do (KR); Yong-Joon Jeon, Gyeonggi-do (KR); Geon-Soo Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/298,221

(22) Filed: Mar. 11, 2019

(65) Prior Publication Data

US 2019/0208557 A1  Jul. 4, 2019

Related U.S. Application Data

(63) Continuation of application No. 14/840,956, filed on Aug. 31, 2015, now Pat. No. 10,231,271.

(30) Foreign Application Priority Data

Aug. 29, 2014 (KR) .................. 10-2014-0114609

(51) Int. Cl.
*H04W 76/14* (2018.01)
*H04W 4/021* (2018.01)
(Continued)

(52) U.S. Cl.
CPC ........... *H04W 76/14* (2018.02); *H04W 4/021* (2013.01); *H04W 76/16* (2018.02)

(58) Field of Classification Search
None
See application file for complete search history.

(56) References Cited

U.S. PATENT DOCUMENTS 8,032,141 B2 * 10/2011 Faye ................. H04L 29/06027
370/338
8,928,587 B1   1/2015 Smus
(Continued)

FOREIGN PATENT DOCUMENTS

KR   10-2012-0049588   5/2012
KR   10-2013-0133717   12/2013

OTHER PUBLICATIONS

Provisional Application, Emily Qi, U.S. Appl. No. 62/038,109, filed Aug. 15, 2014.
(Continued)

*Primary Examiner* — Jay L Vogel
(74) *Attorney, Agent, or Firm* — The Farrell Law Firm, P.C.

(57) ABSTRACT

A first electronic device is provided. The first electronic device includes a communication module and a controller that is configured to request a data list from a second electronic device based on a detection of a charging state of a battery of the first electronic device, receive the data list corresponding to the request, and request at least some elements of data in the received data list from the second electronic device.

20 Claims, 21 Drawing Sheets

(51) Int. Cl.
*H04W 76/16* (2018.01)
*H04W 4/00* (2018.01)
*H04W 88/02* (2009.01)

(56) References Cited

U.S. PATENT DOCUMENTS

| | | | |
|---|---|---|---|
| 10,231,271 B2* | 3/2019 | Kim | H04W 4/021 |
| 2002/0082015 A1* | 6/2002 | Wu | H04L 29/06 |
| | | | 455/436 |
| 2006/0026653 A1 | 2/2006 | Matsunami | |
| 2006/0174008 A1 | 8/2006 | Abanami | |
| 2008/0068196 A1* | 3/2008 | Fujimoto | H04L 67/06 |
| | | | 340/669 |
| 2008/0097908 A1 | 4/2008 | Dicks | |
| 2008/0184142 A1 | 7/2008 | Ijichi | |
| 2008/0194202 A1 | 8/2008 | Song | |
| 2008/0310627 A1 | 12/2008 | Wong et al. | |
| 2009/0191925 A1 | 7/2009 | Moseler | |
| 2011/0040688 A1* | 2/2011 | Ren | G06Q 30/02 |
| | | | 705/59 |
| 2011/0112671 A1 | 5/2011 | Weinstein | |
| 2012/0115549 A1 | 5/2012 | Kim et al. | |
| 2012/0282882 A1* | 11/2012 | Jin | H04W 4/90 |
| | | | 455/404.1 |
| 2013/0318158 A1 | 11/2013 | Teng | |
| 2014/0091987 A1* | 4/2014 | Lee | H04L 65/00 |
| | | | 345/2.3 |
| 2014/0106720 A1 | 4/2014 | Mairs | |
| 2014/0113558 A1* | 4/2014 | Varoglu | H04W 12/08 |
| | | | 455/41.2 |
| 2014/0177632 A1* | 6/2014 | Liu | H04N 21/6405 |
| | | | 370/390 |
| 2014/0215535 A1 | 7/2014 | Elliott et al. | |
| 2015/0050551 A1 | 2/2015 | Ishiji | |
| 2015/0100144 A1 | 4/2015 | Lee et al. | |
| 2015/0271096 A1 | 9/2015 | Das | |
| 2015/0271255 A1 | 9/2015 | Mackay | |
| 2016/0026822 A1* | 1/2016 | Weis | G06F 21/6245 |
| | | | 726/28 |
| 2017/0064495 A1* | 3/2017 | Toya | H04W 4/80 |

OTHER PUBLICATIONS

Korean Office Action dated Jul. 27, 2020 issued in counterpart application No. 10-2014-0114609, 17 pages.

\* cited by examiner

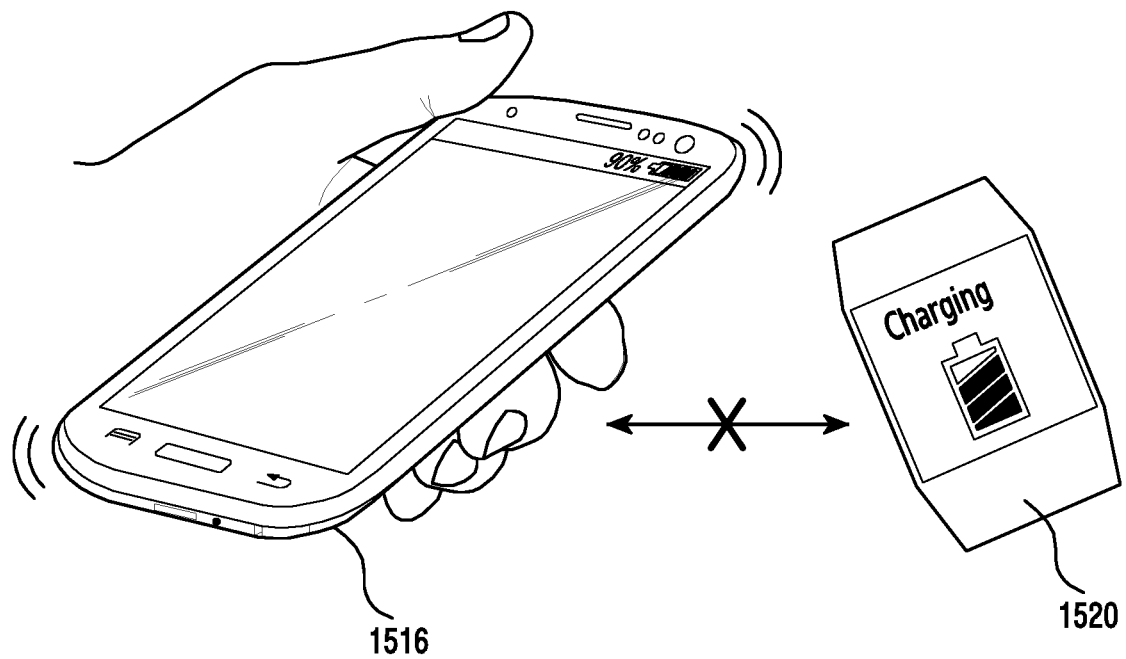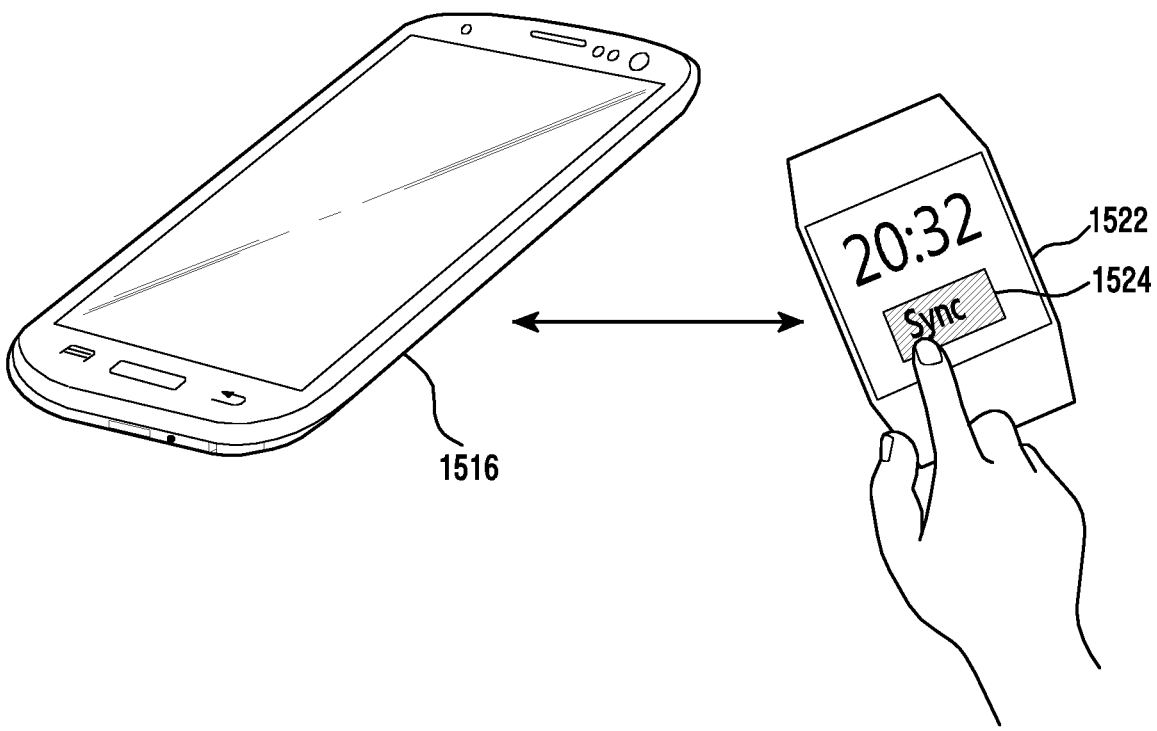
FIG.15B

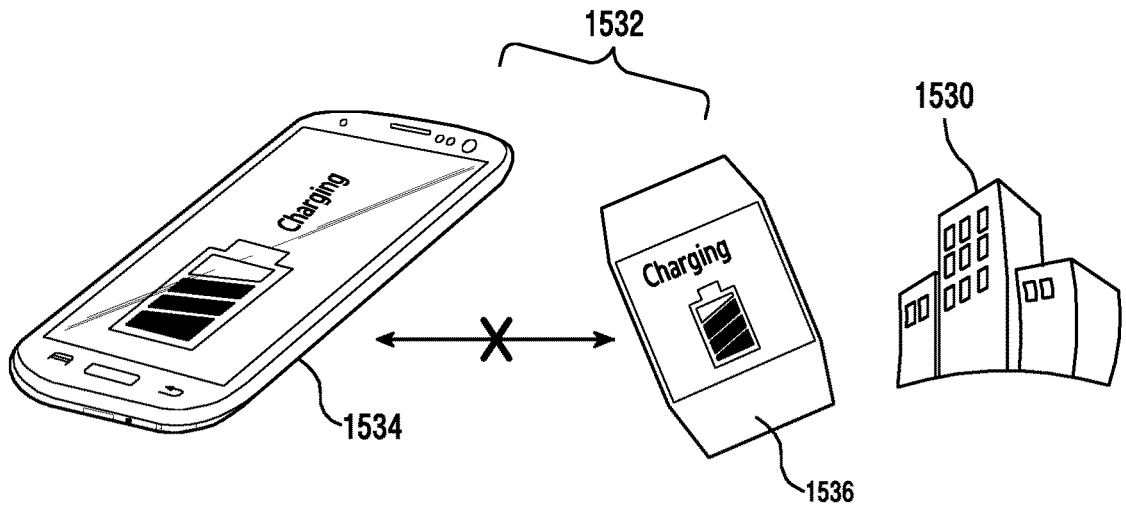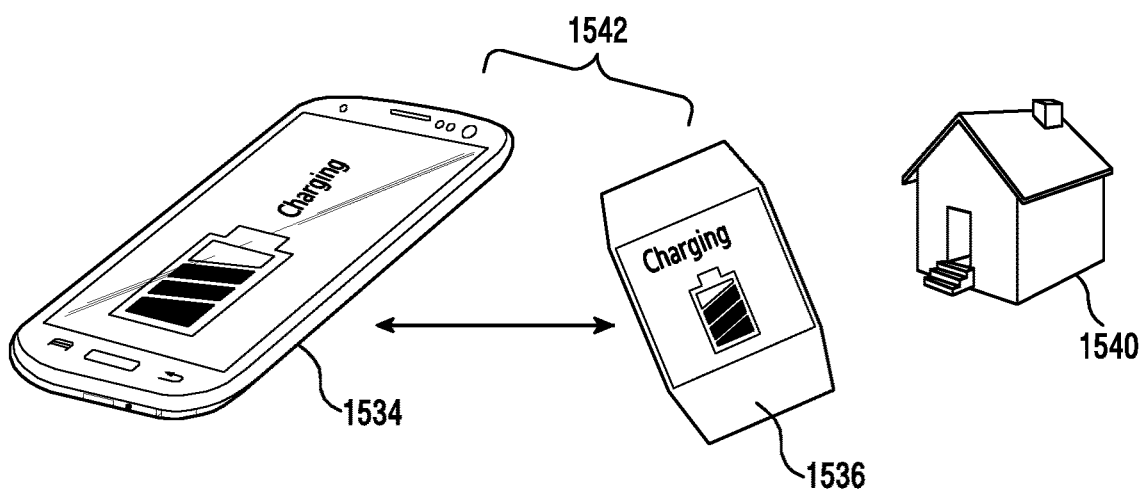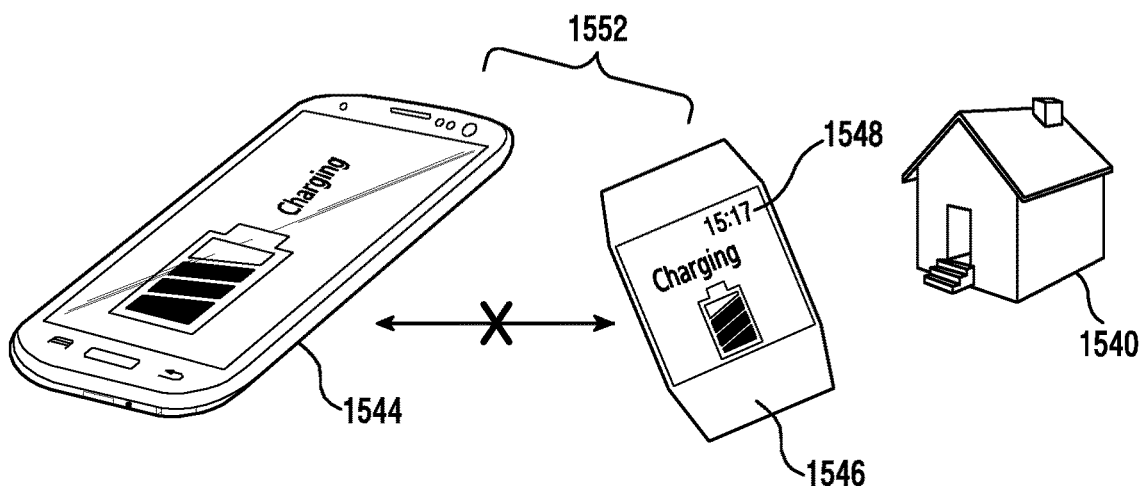
FIG.15C

METHOD USING A TIME POINT FOR SHARING DATA BETWEEN ELECTRONIC DEVICES BASED ON SITUATION INFORMATION

PRIORITY

This continuation application claims priority under 35 U.S.C. § 120 to U.S. patent application Ser. No. 14/840,956, which was filed in the United States Patent and Trademark Office on Aug. 31, 2015, which claimed priority under 35 U.S.C. § 119(a) to Korean Patent Application Serial No. 10-2014-0114609, which was filed in the Korean Intellectual Property Office on Aug. 29, 2014, the entire content of each of which is incorporated herein by reference.

BACKGROUND OF THE INVENTION

1. Field of the Invention

The present invention relates generally to a method and an electronic device for sharing data, and more particularly, to an electronic device that uses a time point for sharing data with a second electronic device based on situation information.

2. Description of the Related Art

According to the development of electronic device technology, e.g., a smart phone, a tablet, etc., and the introduction of the wireless Internet, electronic device have a wide range of uses, such as a device for games, a remote controller using short range communication, and a device for photographing an image through a mounted digital camera, as well as being able to make a simple phone call or schedule management, thereby satisfying the demands of a user.

In addition, the electronic device may establish a network with neighboring devices. Accordingly, the electronic device may also share data with the neighboring devices connected through the network. For example, the electronic device may use short range communication (for example, Wi-Fi®, NFC, and Bluetooth®) for sharing data.

In general, a first electronic device may perform a communication connection with a second electronic device, and then transmit stored data to the second electronic device. However, there is a problem in that a user needs to directly control the first electronic device for providing the communication connection with the second electronic device and for selecting data to be transmitted to the second electronic device.

SUMMARY OF THE INVENTION

The present invention has been made to address at least the above mentioned problems and/or disadvantages and to provide at least the advantages described below.

According to an aspect of the present invention, a first electronic device may determine a time point for sharing data with a second electronic device based on situation information.

According to an aspect of the present invention, a first electronic device may confirm data to be requested from the second electronic device based on situation information.

In accordance with an aspect of the present invention, there is provided a first electronic device. The first electronic device includes a communication module and a controller configured to request a data list from a second electronic device based on a detection of a charging state of a battery of the first electronic device, receive the data list corresponding to the request, and request at least some elements of data in the received data list from the second electronic device.

In accordance with an aspect of the present invention, there is provided a second electronic device. The second electronic device includes a communication module and a controller configured to transmit a data list of the second electronic device to a first electronic device based on a state of the second electronic device in response to a request of the first electronic device for the data list, and transmit data to the first electronic device in response to another request of the first electronic device.

In accordance with an aspect of the present invention, there is provided a method of operating a first electronic device. The method includes requesting a data list from a second electronic device based on a detection of a charging state of a battery of the first electronic device, receiving the data list corresponding to the request from the second electronic device and selecting one or more elements of data, and requesting the selected data from the second electronic device and receiving the selected data.

In accordance with an aspect of the present invention, there is provided a device for sharing data. The device includes a first electronic device configured to request a data list from a second electronic device in response to a detection of charging, receive the data list corresponding to the request, and request one or more elements of data from the second electronic device and the second electronic device configured to transmit the data list of the second electronic device based on a state of the second electronic device in response to the request of the first electronic device for the data list, and transmit the one or more elements of data to the first electronic device in response to the request of the one or more elements of the first electronic device.

In accordance with another aspect of present disclosure, a method of operating a second electronic device includes transmitting a data list of the second electronic device to the first electronic device based on a state of the second electronic device in response to the request of the first electronic device for the data list; and transmitting data to the first electronic device in response to the request of the first electronic device.

Another embodiment of the present disclosure provides a computer readable recording medium including a program for executing requesting a data list from a second electronic device based on a detection of a state of charge of a battery of the first electronic device, receiving the data list from the second electronic device in response to the request and selecting one or more elements of data, and requesting the selected data from the second electronic device and receiving the data.

Another embodiment of the present disclosure provides a computer readable recording medium including a program for executing transmitting a data list of a second electronic device based on a state of the second electronic device in response to a request of the first electronic device for the data list, and transmitting data to the first electronic device in response to the request of the first electronic device.

BRIEF DESCRIPTION OF THE DRAWINGS

The above and other aspects, features, and advantages of the present invention will be more apparent from the following detailed description taken in conjunction with the accompanying drawings, in which:

FIGS. 15A-15C are diagrams illustrating a situation in which a first electronic device and a second electronic device share data, according to an embodiment of the present invention;

DETAILED DESCRIPTION OF EMBODIMENTS OF THE PRESENT INVENTION

Figure 1A:
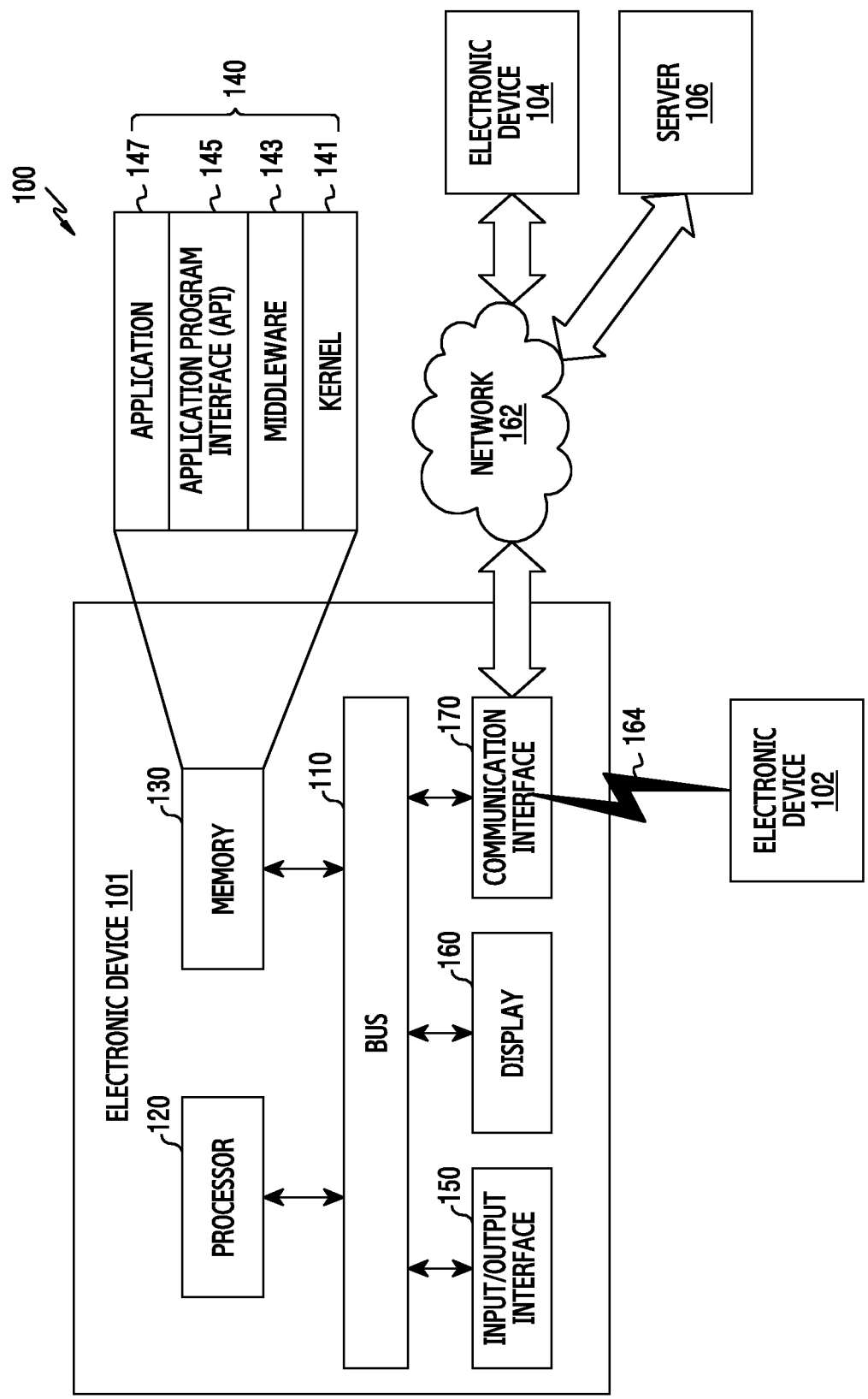
FIG. 1A is a diagram illustrating a network environment including an electronic device, according to an embodiment of the present invention.

Hereinafter, embodiments of the present invention are described in detail with reference to the accompanying drawings. Those of ordinary skill in the art will recognize that various changes and modifications of the embodiments described herein can be made without departing from the scope of the present invention. In addition, descriptions of well-known functions and constructions may be omitted for clarity and conciseness. The same reference symbols are used throughout the drawings to refer to the same or like parts.

Expressions such as "include" or "may include" that may be used in the present disclosure indicate existence of a disclosed relevant function, operation, or element, etc., and do not limit additional one or more functions, operations, or elements, etc. Also, it should be understood that terms such as "include" or "have" in the present disclosure are intended for designating the existence of a characteristic, a number, a step, an operation, an element, a part, or a combination thereof described in this disclosure and do not exclude in advance the existence or additional possibility of one or more other characteristics, numbers, steps, operations, elements, parts, or a combination thereof.

An expression such as "or", etc. in the present invention includes a certain and all combinations of words listed together. For example, "A or B" may include A and may include B, or include both A and B.

In the present invention, expressions such as "1st", "2nd", "first" or "second", etc. may modify various elements of the present disclosure but do not limit relevant elements. For example, these expressions do not limit sequence and/or importance, etc. of relevant elements. The expressions may be used for distinguishing one element from another element. For example, both a first user apparatus and a second user apparatus are all user apparatuses, and represent different user apparatuses. For example, a first element may be referred to as a second element, and similarly, the second element may be referred to as the first element.

When it is mentioned that a certain element is "connected to" or "accesses" another element, it should be understood that the element may be directly connected to another element or may directly access another element, but still another element may exist in the middle. In contrast, when it is mentioned that a certain element is "directly connected to" or "directly accesses" another element, it should be understood that still another element does not exist in the middle.

Terminology used in the present disclosure is used for explaining a specific embodiment and is not intended for limiting the present invention. Unless clearly expressed otherwise, expression of the singular includes expression of the plural.

Unless defined differently, all terminologies used herein including technological or scientific terminologies have the same meaning as that generally understood by a person of ordinary skill in the art to which the present invention belongs. It should be understood that generally used terminologies defined by a dictionary have meanings consistent with meanings of a related technology, and unless clearly defined in the present disclosure, they are not understood as an ideal or excessively formal meaning.

The term "module" as used herein may be defined as, for example, a unit including a combination of one or two or more among a hardware, a software, or a firmware. The term "module" may be interchangeably used with the phrase unit, logic, a logical block, a component, or a circuit, etc. A "module" may be a minimum unit of an integrally configured part or a portion thereof. A "module" may be a minimum unit performing one or more functions or a portion thereof. A "module" may be mechanically or electronically implemented. For example, a "module" according to the present invention may include at least one of an Application-Specific Integrated Circuit (ASIC) chip, a Field-Programmable Gate Arrays (FPGAs), or a programmable-logic device which are known, or to be developed in the future, and performing certain operations.

An electronic device according to the present invention may be a device including a communication function. For example, an electronic device may include at least one of, but is not limited to, a smartphone, a tablet personal computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, a camera, or a wearable device (e.g., a head-mounted-device (HMD) such as electronic glasses, an electronic clothing, an electronic bracelet, an electronic necklace, an electronic appcessory, an electronic tattoo, or a smartwatch).

The electronic device may be a smart home appliance having a communication function. A smart home appliance may include, but is not limited to, at least one of a television, a Digital Video Disk (DVD) player, an audio, a refrigerator, an air conditioner, a cleaner, an oven, an electronic range, a washing machine, an air purifier, a set-top box, a TV box (e.g., Samsung HomeSync®, Apple TV®, or Google TV®), game consoles, an electronic dictionary, an electronic key, a camcorder, or an electronic frame.

The electronic device may include, but is not limited to, at least one of various medical devices (e.g., Magnetic Resonance Angiography (MRA), Magnetic Resonance Imaging (MRI), Computed Tomography (CT), a shooting device, an ultrasonic device, etc.), a navigation device, a Global Positioning System (GPS) receiver, an event data recorder (EDR), a flight data recorder (FDR), an automobile infotainment device, electronic equipment for a ship (e.g., a navigation device for a ship, a gyro compass, etc.), avionics, a security device, or a robot for an industrial use or a home use.

The electronic device may include, but is not limited to, at least one of furniture or a portion of a building/structure including a communication function, an electronic board, an electronic signature receiving device, a projector, or various measurement devices (e.g., waterworks, electricity, gas, or radio wave measuring device, etc.). The electronic device may be a combination of one or more of the above-described devices. Also, the electronic device is not limited to the above-described devices.

Hereinafter, an electronic device is described with reference to the accompanying drawings. A user as described herein may indicate a person who uses an electronic device or a device (e.g., an artificial intelligence electronic device) that uses the electronic device.

FIG. 1A is a diagram illustrating a network environment 100 including an electronic device 101, according to an embodiment of the present invention.

Referring to FIG. 1, the electronic device 101 includes a bus 110, a processor 120, a memory 130, an input/output (I/O) interface 150, a display 160, and a communication interface 170.

The bus 110 may be a circuit for connecting the above-described elements with each other, and transferring communication (e.g., a control message) between the above-described elements.

The processor 120 may include a Central Processing Unit (CPU), a Communication Processor (CP), a Graphic Processing Unit (GPU).

The processor 120 receives, for example, an instruction from the above-described other elements (e.g., the memory 130, the I/O interface 150, the display 160, or the communication interface 170, etc.) via the bus 110, deciphers the received instruction, and executes an operation or a data process corresponding to the deciphered instruction.

The memory 130 stores an instruction or data received from the processor 120 or other elements (e.g., the I/O interface 150, the display 160, or the communication interface 170, etc.), or generated by the processor 120 or other elements. The memory 130 includes, for example, programming modules 140, such as a kernel 141, a middleware 143, an application programming interface (API) 145, or an application 147. Each of the programming modules may be configured using software, firmware, hardware, or a combination of two or more of these devices.

The kernel 141 controls or manages system resources (e.g., the bus 110, the processor 120, or the memory 130, etc.) used for executing an operation or a function implemented in the rest of the programming modules, for example, the middleware 143, the API 145, or the application 147. Also, the kernel 141 provides an interface for allowing the middleware 143, the API 145, or the application 147 to access an individual element of the electronic device 101, and controls or manages the same.

The middleware 143 performs a mediation role so that the API 145 and/or the application 147 may communicate with the kernel 141, e.g., to transmit and receive data. Also, in connection with task requests received from the applications 147, the middleware 143 may perform a control (e.g., scheduling or load balancing) for or generate a task request using, for example, a method of assigning priority that may use a system resource of the electronic device 101 to at least one application 134.

The API 145 is an interface for allowing the application 147 to control a function provided by the kernel 141 or the middleware 143, and may include at least one interface or function (e.g., an instruction) for file control, window control, image processing, or character control, etc.

The application 147 may include a Short Message Service/Multimedia Messaging Service SMS/MMS application, an e-mail application, a calendar application, alarm application, a health care application (e.g., an application for measuring quantity of motion or blood sugar, etc.), or an environment information application (e.g., an application providing atmospheric pressure, humidity or temperature information, etc.). Additionally or alternatively, the application 147 may be an application related to information exchange between the electronic device 101 and an external electronic device (e.g., the electronic device 102 or 104). The application related to the information exchange may include, for example, a notification relay application for transferring specific information to the external electronic device or a device management application for managing the external electronic device.

For example, the notification relay application may include a function for transferring notification information generated from a different application (e.g., an SMS/MMS application, an e-mail application, a health care application, or an environment information application) of the electronic device 101 to the external the electronic device 102 or 104. Additionally or alternatively, the notification relay application may, for example, receive notification information from the external electronic device 102 or 104 and provide the same to a user.

The device management application may manage (e.g., install, delete, or update) a function (e.g., turn-on/turn-off an external electronic device itself (or some constituent part) or luminance (or resolution) control of a display) of the external electronic device 102 or 104 communicating with the electronic device 101 and an application operating in the external electronic device or a service (e.g., a communication service or a message service) provided by the external electronic device.

The application 147 may include a designated application depending on an attribute (e.g., a kind of an electronic device) of the external electronic device 104. For example, in the case where the external electronic device is an MP3 player, the application 147 may include an application related to music reproduction. Similarly, in the case where the external electronic device is a mobile medical health care device, the application 147 may include an application related to health care. The application 147 may include at least one of an application designated in the electronic device 101 and an application received from the external electronic device (e.g., a server 106, the electronic devices 102 or 104).

The I/O interface 150 transfers an instruction or data input from a user via an I/O unit (e.g., a sensor, a keyboard, or a touchscreen) to the processor 120, the memory 130, or the communication interface 170 via the bus 110. For example, the I/O interface 150 provides data regarding a user's touch input via the touchscreen to the processor 120. Also, the I/O interface 150 may, for example, output an instruction or data received via the bus 110 from the processor 120, the memory 130, or the communication interface 170 via the I/O unit (e.g., a speaker or a display). For example, the I/O interface 150 outputs voice data processed by the processor 120 to a user via a speaker.

The display 160 may include, for example, a Liquid Crystal Display (LCD), a Light Emitting Diode (LED) display, an Organic Light Emitting Diode (OLED) display, a Micro Electro Mechanical System (MEMS) display, or an electronic paper display. The display 160 displays various types of contents (for example, text, images, videos, icons, or symbols) for users. The display 160 may include a touch screen, and may receive, for example, a touch, gesture, proximity, or hovering input by using an electronic pen or a part of the user's body.

The display 160 displays a contact list based on a priority of each of the contacts included in the contact list. For example, the priority of the contacts may be determined based on at least one of a transmission history, a transmission frequency, a transmission speed, a charging policy, intimacy, a counterpart's location, a schedule, or application preference.

The display 160 displays a service list based on a priority of each of the applications or services included in the service list. For example, the priority of the applications or services may be determined based on configuration information of a service provider, configuration information of a manufacturer, contact information, application preference, user preference, a use time point, a distance from a target to share contents, a transmission history, and a charging policy.

The communication interface 170 provides communication between the electronic device 101 and the external device 104 106. For example, the communication interface 170 may be connected to a network 162 through wireless communication or wired communication, and may communicate with the external device 104 or the server 106.

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM) as a cellular communication protocol.

The wireless communication may include at least one of, for example, WiFi®, Bluetooth®, BLE, Zigbee®, Infrared (IR) communication, and ultrasonic communication as a short-range communication protocol 164.

The wired communication may include, for example, at least one of Universal Serial Bus (USB), High Definition Multimedia Interface (HDMI), Recommended Standard 232 (RS-232), and Plain Old telephone Service (POTS).

The network 162 may include at least one of a computer network (for example, a LAN or a WAN), the Internet, and a telephone network.

The electronic devices 102 and 104 may be devices of the same type as that the electronic device 101 or devices of different types from that of the electronic device 101. The server 106 may include a group of one or more servers. All or some of the operations executed in the electronic device 101 may be carried out in another electronic device or a plurality of electronic devices 102, 104 and 106. When the electronic device 101 is required to perform functions or services automatically or by a request, the electronic device 101 may make a request for performing at least some functions related to the functions or services to another electronic device 102 or 104, or the server 106 instead of performing the functions or services by itself or additionally. The electronic device 102, 104, or 106 may carry out the functions requested by the electronic device 101 or additional functions and provide results thereof to the electronic device 101. The electronic device 101 may provide the requested functions or services to another electronic device based on the received results or after additionally processing the received results. To this end, for example, cloud computing, distributed computing, or client-server computing technology may be used by the electronic device 101.

Figure 1B:
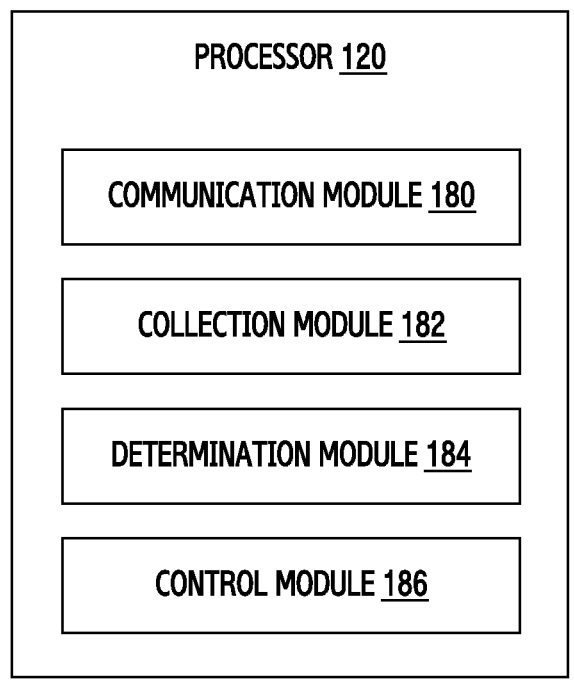
FIG. 1B is a diagram illustrating a configuration of a processor, according to an embodiment of the present invention.

FIG. 1B is a diagram illustrating a configuration of the processor 120, according to an embodiment of the present invention.

The processor 120 may be used in the electronic device 101 of FIG. 1A) or a neighboring device (e.g., the external electronic devices 102 and 104). For illustrative purposes, the processor 120 is described in terms of use with the electronic device 101.

The processor 120 includes a communication module 180, a collection module 182, a determination module 184, and a control module 186.

The communication module 180 may be configured to support a wireless communication interface. The communication module 180 may include a wireless communication module that supports short range communication with a neighboring device. The communication module 180 may support various types of short range communication methods, for example, Bluetooth® Low Energy (BLE), Bluetooth®, Infrared Data Association (IRDA), Near Field Communication (NFC), or Radio Frequency Identification (RFID).

The communication module 180 may include a plurality of wireless communication modules. For example, the communication module 180 may include a first communication module and a second communication module which operate according to a short range communication method. Here, the first communication module may support a Bluetooth® method, and the second communication module may support a different communication method from that of the first communication module. For example, the second communication module may support a Wi-Fi® method.

The first communication module may be operated when the second communication module is operated in a sleep mode. The first communication module may transceive information associated with a context, when the second communication module is operated in a normal mode, by connecting communication with the second electronic device.

The collection module 182 collects information associated with a context of the electronic device 101. The collection module 182 collects information associated with a time, surrounding noise, surrounding brightness, a movement of the first electronic device, a charging time of a battery of the electronic device 101, a charging state of the battery, and the like.

For example, the collection module 182 detects a movement of the electronic device 101. For example, the collection module 182 may include a magnetic sensor which detects a surrounding magnetic field, an acceleration sensor which outputs an electric signal according to three axial accelerations generated from a movement of the electronic device 101, an inertia sensor which outputs an electric signal according to three axial position changes from a movement of the electronic device 101.

The collection module 182 may include a microphone which detects a surrounding noise of the electronic device 101, a luminance sensor which detects surrounding light of the electronic device 101, and the like.

The collection module 182 communicates with a power management module of the electronic device 101 and obtains information on a charge time of a battery of the electronic device 101, whether the battery is charged, a current charge quantity of the battery, and a consumption quantity of the battery, and the like. In this case, the determination module 184 confirms whether the electronic device 101 is in a charged state, whether the battery is sufficiently charged, whether the battery is in a chargeable state (for example, whether the battery is positioned in a charging available region), and the like, based on the information collected by the collection module 182.

The determination module 184 determines whether the information collected by the collection module 182 satisfies a condition defined for data (e.g., contents) sharing execution or sharing data selection.

A data sharing execution condition may be set based on a charging situation. For example, when the determination module 184 obtains information indicating that the electronic device 101 is being charged, the determination module 184 determines that the data sharing execution condition is satisfied. When the determination module 184 obtains information indicating that the electronic device 101 and another electronic device 102 or 104, which is connected with the electronic device 101, are being charged, the determination module 184 determines that the data sharing execution condition is satisfied.

The data sharing execution condition may be set based on a charge quantity of the battery of the electronic device 101. For example, when the determination module 184 obtains information indicating that the electronic device 101 acquires the sufficient charge quantity of the battery to share data, the determination module 184 determines that the data sharing execution condition is satisfied. When the determination module 184 confirms and/or receives information indicating that the another electronic device connected with the electronic device 101 is being charged, and the electronic device 101 possesses the charge quantity of battery for executing a data sharing operation (e.g., the remaining charge quantity of battery is greater than or equal to 20%), the determination module 184 determines that the data sharing execution condition is satisfied.

The data sharing execution condition may be set based on an input of a user. For example, when the determination module 184 detects an input for sharing data through the electronic device 101, the determination module 184 determines that the data sharing execution condition is satisfied.

The data sharing execution condition may be set based on an awareness of a life pattern (or an environment) or context of a user. For example, when the determination module 184 confirms a context (in which users possessing the electronic device 101 and the another electronic device connected with the electronic device 101 sleep) and information corresponding to a location (e.g., a region in which the electronic device 101 is chargeable) thereby satisfying the condition, the determination module 184 determines that the data sharing execution condition is satisfied.

The data sharing execution condition may be set based on an update state of data. For example, when the determination module 184 detects a change state (e.g., a data change rate is greater than or equal to 50%) of data stored in a storage module of the electronic device 101, the determination module 184 determines that the data sharing execution condition is satisfied.

The data sharing execution condition may be set based on a movement of the electronic device 101. For example, when the determination module 184 confirms that there is no movement of the electronic device 101, and the another electronic device connected with the electronic device (e.g., it is determined that a user does not control the electronic device 101), the determination module 184 determines that the data sharing execution condition is satisfied.

The data sharing execution condition may be set based on a situation that another communication-connected electronic device satisfies the data sharing execution condition. For example, when the determination module 184 confirms a reception of a notification notifying that the sharing data execution-condition is satisfied from the another electronic device, which is connected with the electronic device 101, the determination module 184 determines that the data sharing execution condition is satisfied.

The data sharing execution condition may be set by combining two or more of the aforementioned conditions.

The determination module 184 selects data that is to be shared among the data stored in the another electronic device that is connected to the electronic device 101. The condition defined for the sharing data selection may be associated with a pattern of a user and a size of a storage space of the electronic device 101.

When a storage space of the electronic device 101 is not enough to store sharing data stored in the another electronic device that is connected to the electronic device 101, the determination module 184 selects data storage in a storage space based on a pattern of a user (e.g., a data reproduction environment, a data reproduction frequency, or a reproduction time). For example, when the data is a music file, the data reproduction environment may be associated with a time at which a user reproduces the music file, the number of times of reproduction, a place where a user reproduces the music file, or the like. In this case, the determination module 184 selects a music file associated with sleep as sharing desired data in response to the determination that the user reproduces a music file at a bedtime.

When a storage space of the electronic device is not sufficient to store sharing data, the determination module 184 selects data to be deleted in order to secure the storage space. For example, the determination module 184 selects data having a low use frequency as deletion data so as to secure the storage space.

The determination module 184 defines a time of requesting data to be shared, a time interval, and the like. The determination module 184 requests data based on a heating state of the electronic device 101. For example, when the determination module 184 detects a temperature of the electronic device 101 and determines that the detected temperature is greater than or equal to a threshold value, the determination module 184 requests data transmission at an interval of a predetermined time. For example, when the determination module 184 selects 10 elements of data as sharing data, the determination module 184 requests and receives data, for example, three elements of data, according to a temperature of the electronic device, waits a predetermined time (for example, 10 seconds), and then requests and receives the other seven elements of data according to the temperature.

The control module 186 controls a data sharing operation based on a result of the determination of the determination module 184.

When the data sharing execution condition is satisfied, the control module 186 requests a data list from the another electronic device that is connected to the electronic device 101. For example, the control module 186 requests a list associated with recently reproduced data, recently added data, sharing data defined by a user, frequently reproduced data and the like among the data stored in the another electronic device. For another example, the control module 186 requests a list associated with a list file (e.g., an m3u file) stored in the another electronic device.

The control module 186 requests data that is to be shared from the another electronic device and receives the requested data from the another electronic device.

The control module 186 may control a communication method of the electronic device 101. More particularly, the control module 186 requests a data list based on a first communication method and receives data based on the first communication method or a second communication method.

For example, when the control module 186 requests a data list through the first communication method (e.g., Bluetooth®) and data to be shared is selected based on the received list, the control module 186 activates an operation of a communication module supporting the second communication method (e.g., Wi-Fi®), which may have better data transmission performance than that of the first communication method, and then connects with the another electronic device based on the second communication method. In this case, when the control module 186 is completely connected with the another electronic device based on the second communication method, the control module 186 receives data based on the second communication method, and when the control module 186 is not connected with the another electronic device based on the second communication method, the control module 186 receives data based on the first communication method.

Figure 1C:
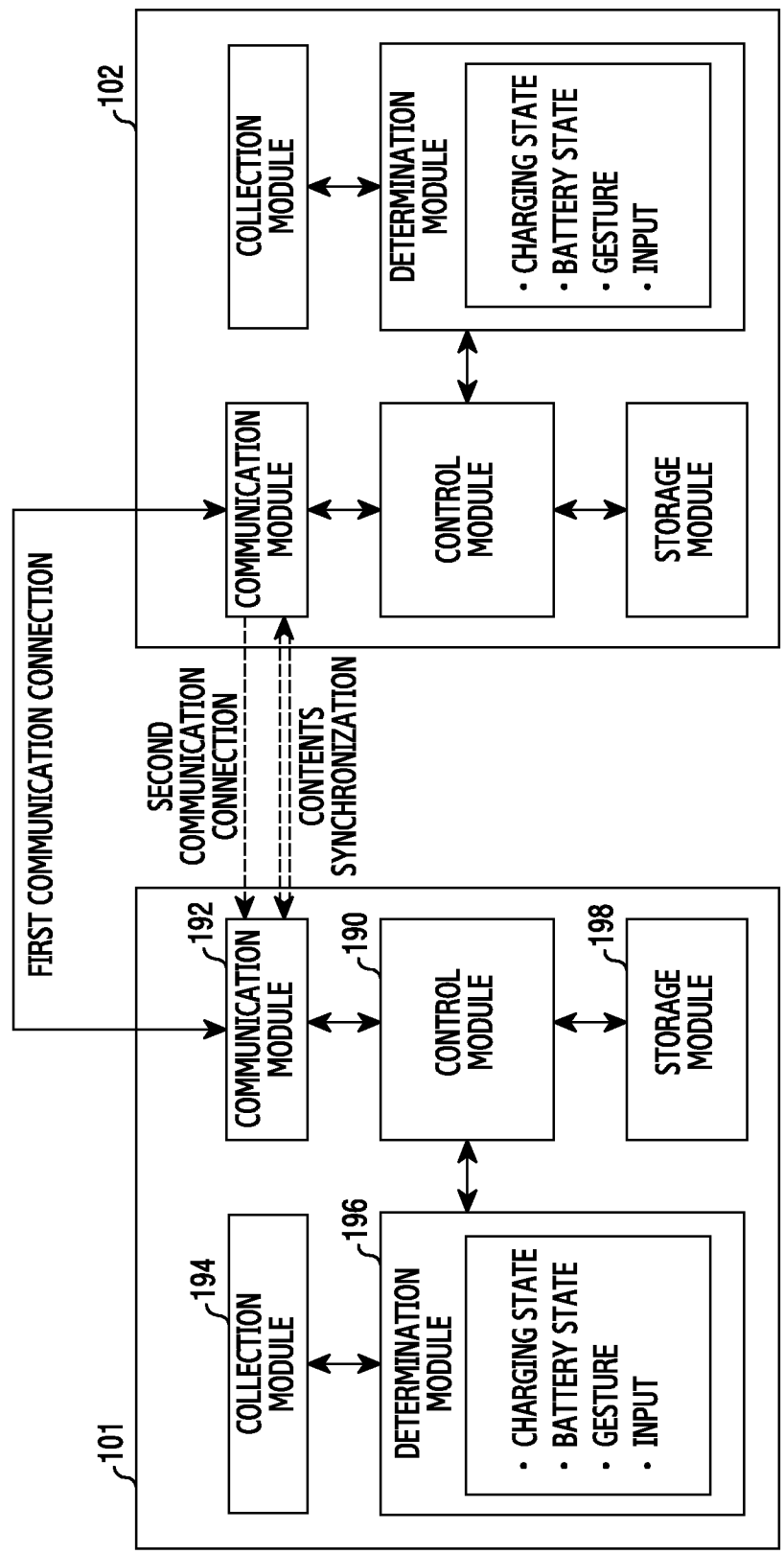
FIG. 1C is a diagram illustrating a data sharing system, according to an embodiment of the present invention.

FIG. 1C is a diagram illustrating a data sharing system, according to an embodiment of the present invention.

The data sharing system may include the first electronic device 101 and the second electronic device 102. The first electronic device 101 may be a wearable device which may be paired with the second electronic device 102 to transceive data, and the second electronic device 102 may be a smart phone, providing a mobile communication function.

The first electronic device 101 includes a control module 190, a communication module 192, a collection module 194, a determination module 196, and a storage module 198, and the second electronic device 102 may also include a control module, a communication module, a collection module, a determination module, and a storage module.

The first electronic device 101 and the second electronic device 102 collect context information when they are connected based on the first communication method, and determine whether to execute data sharing based on the collected information.

For example, the determination module 196 of the first electronic device 101 determines whether information associated with the data sharing execution is collected based on the information collected through the collection module 194.

The determination module 196 sets a data sharing execution condition based on a state of charge, a chargeable state, a battery state, location information, context awareness, a gesture, or a key input, and confirms whether information corresponding to a predetermined condition is collected or satisfied. For example, when a currently charging state or a currently charged state greater than or equal to a threshold value is set as the data sharing execution condition of the first electronic device 101, the determination module 196 confirms whether the first electronic device 101 is in a charging state. For another example, when a predefined location is set as the data sharing execution condition of the first electronic device 101, the determination module 196 confirms whether the first electronic device 101 moves to a predetermined location.

When information satisfying the data sharing execution condition is collected, the first electronic device 101 provides the second electronic device 102 with information indicating that the data sharing execution condition is satisfied through the communication module 192 under a control of the control module 190.

The second electronic device 102 determines whether the data sharing execution condition is satisfied. The determination module of the second electronic device 102 determines the data sharing execution condition based on the information collected through the collection module.

When the second electronic device 102 confirms that the data sharing execution condition is satisfied, the second electronic device 102 transmits information (e.g., a stored data list) relating to sharing data stored in the storage module to the first electronic device 101 through the communication module. For example, the second electronic device 102 provides a data list corresponding to the request received from the first electronic device 101. When the first electronic device 101 pre-stores a data list of the second electronic device 102, the second electronic device 102 may omit the provision of the data list to the first electronic device 101.

Accordingly, the first electronic device 101 requests data stored in the second electronic device 102 based on the data list received from the second electronic device 102 and stores the received data in the storage module 198 of the first electronic device 101.

The first electronic device 101 divides data, which is to be received from the second electronic device 102, based on a storage state of the storage module 198. For example, the control module 190 of the second electronic device 102 determines whether all of the data included in the sharing data list received from the second electronic device 102 can be stored in the storage module 198.

When the control module 190 confirms that a space of the storage module 198 is insufficient to store the data of the second electronic device 102, the control module 190 requests some data included in the received sharing data list from the second electronic device 102. In this case, the control module 190 selects data to be requested based on a pattern of a user. For example, when the sharing data is a music file, the control module 190 requests a music file frequently reproduced by a user and music files of a genre corresponding to the frequently reproduced music file from the second electronic device 102. The data requested from the second electronic device 102 may be data which is not stored in the first electronic device 101 and selected based on a pattern of a user among the data stored only in the second electronic device 102.

The control module 190 secures a space of the storage module 198 in order to store all of the data included in the sharing data list. The control module 190 secures a space for the data based on a use frequency, a priority, and the like among the stored data. For example, the control module 190 deletes data having a low use frequency among the stored data, and when data has a low use frequency, but is set with a priority, the data may not be deleted. The control module 190 secures a data space capable of storing data which is not stored in the first electronic device 101 among the data included in the data list of the second electronic device 102. When the data list of the second electronic device 102 includes 10 elements of data and four elements of data included in the data list are pre-stored in the first electronic device 101, the control module 190 may select six elements of data, which does not overlap the four elements of the pre-stored data, as sharing data. In this context, when the storage space of the first electronic device 101 is capable of storing only two elements of data, the control module 190 may secure a storage space by deleting four elements of data, which are not included in the data list, among the data stored in the first electronic device 101, based on the condition, and then request non-overlapping six elements of data.

The control module 190 of the first electronic device 101 may set a data request interval. The control module 190 requests data based on a temperature of the first electronic device 101. For example, the control module 190 confirms a temperature of the first electronic device 101, and when a temperature of the electronic device 101, which is greater than or equal to a threshold value, is detected, the control module 190 requests transmission of data at a predetermined time interval. For example, when the control module 190 requests 10 elements of data from the second electronic device 102, the control module 190 requests some of the data, for example, three elements of data, according to a temperature of the electronic device and receives the requested data, waits for a predetermined time (e.g., 10 seconds), and then requests seven elements of data according to a temperature of the electronic device 101 and receives the requested data.

The control module 190 processes the temperature information about the first electronic device 101 and provides the processed temperature information to the second electronic device 102, and a data transmission interval is determined by the second electronic device 102.

The second electronic device 102 receives the request for the data by the first electronic device 101 and transmits data associated with the request among the data stored in the storage module to the first electronic device 101 in response to the request.

There may be a case where the data corresponding to the request of the first electronic device 101 does not exist in the second electronic device 102. For example, the second electronic device 102 transmits the sharing data list to the first electronic device 101, and some of the data included in the sharing data list may be deleted. In this case, the data corresponding to the request of the first electronic device 101 may not exist in the second electronic device 102. For another example, when the second electronic device 102 reproduces data by using a streaming method, the streaming data may be included in the list. In this case, the streaming data does not exist in the second electronic device 102, but the first electronic device 101 may determine that the data is stored in the second electronic device 102 through the list.

When the data corresponding to the request of the first electronic device 101 does not exist in the second electronic device 102 as described above, the second electronic device 102 stores information associated with the data corresponding to the request and provides the information to the first electronic device 101 at a time at which the data corresponding to the request is stored in the second electronic device 102.

The second electronic device 102 receives the request for the data by the first electronic device 101 and transmits data associated with the request among the data stored in the storage module to a third electronic device (for example, a server 106 connected with the second electronic device 102) in response to the request.

Figure 2:
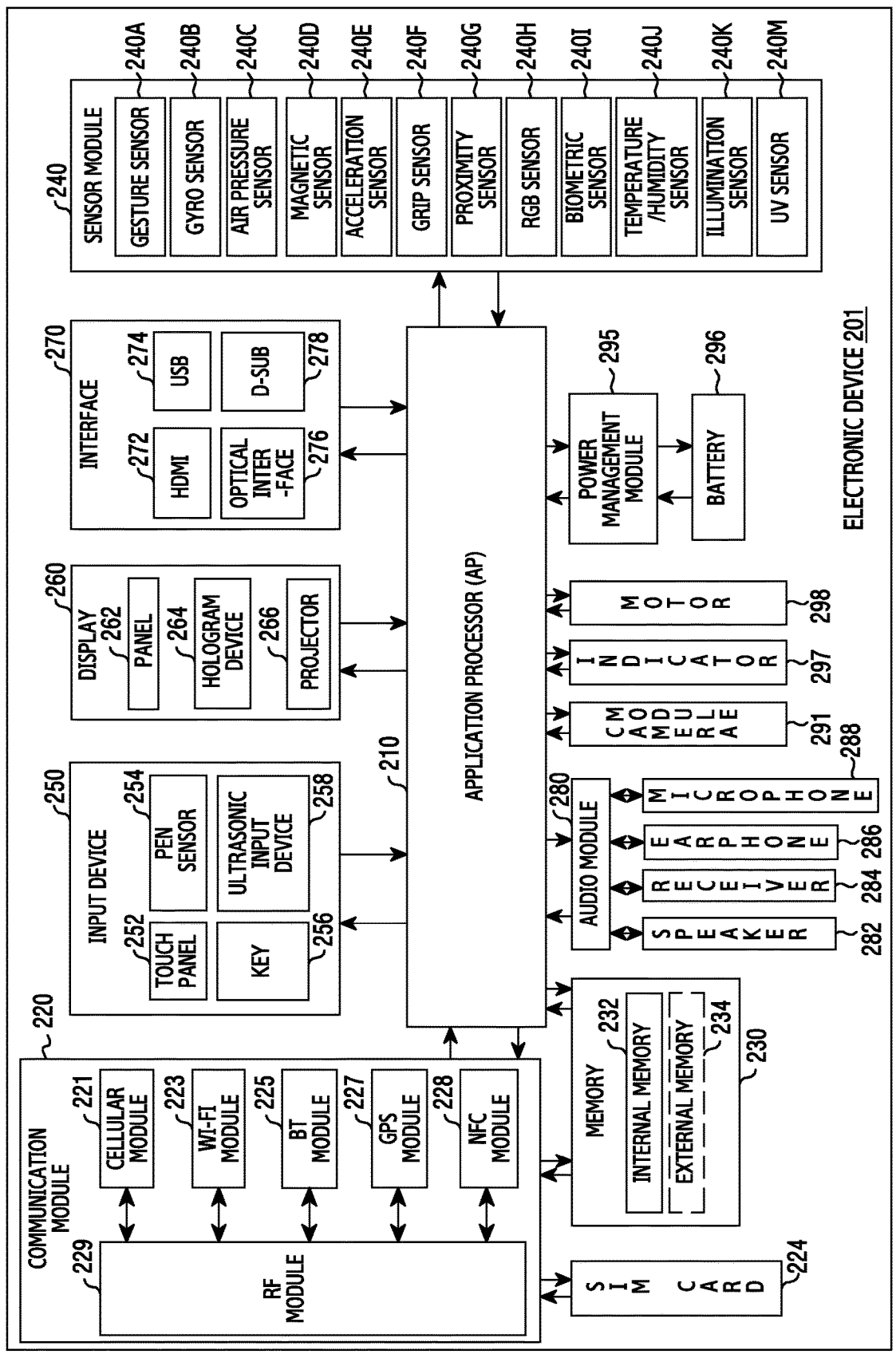
FIG. 2 is a diagram of an electronic device, according to an embodiment of the present invention.

FIG. 2 is a diagram illustrating an electronic device 201, according to an embodiment of the present invention. The electronic device 201 may include all or some of the components of the electronic device 101 illustrated in FIG. 1A.

Referring to FIG. 2, the electronic device 201 may include one or more application processors (AP) 210, a communication module 220, a subscriber identification module (SIM) card 224, a memory 230, a sensor module 240, an input unit 250, a display 260, an interface 270, an audio module 280, a camera module 291, a power management module 295, a battery 296, an indicator 297, or a motor 298.

The AP 210 drives an OS or an application to control a plurality of hardware or software elements connected to the AP 210 and performs various data processes including multimedia data and operations. The AP 210 may be implemented, for example, as a System on Chip (SoC). The AP 210 may further include a Graphic Processing Unit (GPU).

The communication module 220 (e.g., the communication interface 160) performs data transmission/reception in communication between the electronic device 201 and other electronic devices (e.g., the electronic devices 102, 104 or the server 106) connected via the network 162. The communication module 220 includes a cellular module 221, a Wi-Fi® module 223, a BT module 225, a GPS module 227, an NFC module 228, and a Radio Frequency (RF) module 229.

The cellular module 221 provides voice communication, image communication, a short message service, or an Internet service, etc. via a communication network (e.g., LTE, LTE-A, CDMA, WCDMA, UMTS, WiBro, or GSM, etc.). Also, the cellular module 221 may perform discrimination and authentication of an electronic device within a communication network using, for example, a Subscriber Identify Module (e.g., a SIM card 224). The cellular module 221 may perform at least a portion of functions that may be provided by the AP 210. For example, the cellular module 221 may perform at least a portion of a multimedia control function.

The cellular module 221 may include a CP. Also, the cellular module 221 may be, for example, implemented as an SoC. Though elements such as the cellular module 221 (e.g., a communication processor), the memory 230, or the power management module 295, etc. are illustrated as elements separated from the AP 210 in FIG. 2, the AP 210 may be implemented to include at least a portion (e.g., the cellular module 221) of the above-described elements.

The AP 210 or the cellular module 221 (e.g., a communication processor) may load an instruction or data received from at least one of a non-volatile memory and other elements connected thereto onto a volatile memory, and process the same. Also, the AP 210 or the cellular module 221 may store data received from at least one of other elements or generated by at least one of other elements in a non-volatile memory.

Each of the Wi-Fi® module 223, the BT module 225, the GPS module 227, or the NFC module 228 may include, for example, a processor for processing data transmitted/received via a relevant module. Though the cellular module 221, the Wi-Fi® module 223, the BT module 225, the GPS module 227, or the NFC module 228 are illustrated as separate blocks in FIG. 2, at least a portion (e.g., two or more elements) of the cellular module 221, the Wi-Fi® module 223, the BT module 225, the GPS module 227, or the NFC module 228 may be included in one Integrated Circuit (IC) or an IC package. For example, at least a portion (e.g., a communication processor corresponding to the cellular module 221 and a Wi-Fi® processor corresponding to the Wi-Fi® module 223) of processors corresponding to each of the cellular module 221, the Wi-Fi® module 223, the BT module 225, the GPS module 227, or the NFC module 228 may be implemented as one SoC.

The RF module 229 performs transmission/reception of data, for example, transmission/reception of an RF signal. The RF module 229 may include, for example, a transceiver, a Power Amp Module (PAM), a frequency filter, or a Low Noise Amplifier (LNA), etc. Also, the RF module 229 may further include a part for transmitting/receiving an electromagnetic wave on a free space in wireless communication, for example, a conductor or a conducting line, etc. Though FIG. 2 illustrates the cellular module 221, the Wi-Fi® module 223, the BT module 225, the GPS module 227, and the NFC module 228 sharing one RF module 229, at least one of the cellular module 221, the Wi-Fi® module 223, the BT module 225, the GPS module 227, or the NFC module 228 may perform transmission/reception of an RF signal via a separate RF module.

The SIM card 224 may be inserted into a slot formed in a specific position of the electronic device 201. The SIM card 224 may include unique identify information (e.g., Integrated Circuit Card Identifier (ICCID)) or subscriber information (e.g., International Mobile Subscriber Identity (IMSI)).

The memory 230 (e.g., the memory 130) includes a built-in memory 232 or an external memory 234. The built-in memory 232 may include, for example, at least one of a volatile memory (e.g., Dynamic RAM (DRAM), Static RAM (SRAM), Synchronous Dynamic RAM (SDRAM)) and a non-volatile memory (e.g., One Time Programmable ROM (OTPROM), Programmable ROM (PROM), Erasable and Programmable ROM (EPROM), Electrically Erasable and Programmable ROM (EEPROM), mask ROM, flash ROM, NAND flash memory, NOR flash memory, etc.).

The built-in memory 232 may be a Solid State Drive (SSD). The external memory 234 may further include a flash drive, for example, Compact Flash (CF), Secure Digital (SD), Micro Secure Digital (Micro-SD), Mini Secure Digital (Mini-SD), extreme Digital (xD), or a memory stick. The external memory 234 may be functionally connected with the electronic device 201 via various interfaces. The electronic device 201 may further include a storage device (or a storage medium) such as a hard drive.

The sensor module 240 measures a physical quantity or detects an operation state of the electronic device 201 and converts the measured or detected information to an electric signal. The sensor module 240 includes, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., red, green, blue (RGB) sensor), a living body sensor 240I, a temperature/humidity sensor 240J, an illumination sensor 240K, or an Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, or a fingerprint sensor, etc. The sensor module 240 may further include a control circuit for controlling at least one sensor belonging thereto.

The input unit 250 may include a touch panel 252, a (digital) pen sensor 254, a key 256, or an ultrasonic input unit 258. The touch panel 252 recognizes a touch input using at least one of capacitive, resistive, infrared, or ultrasonic methods. Also, the touch panel 252 may further include a control circuit. A capacitive touch panel may perform detection by a physical contact or proximity recognition. The touch panel 252 may further include a tactile layer. In this case, the touch panel 252 may provide a tactile reaction to a user.

The (digital) pen sensor 254 may be implemented using, for example, a method which is the same as or similar to receiving a user's touch input, or using a separate sheet for detection. The key 256 may include, for example, a physical button, an optical key or keypad. The ultrasonic input unit 258 is a unit for recognizing data by detecting a sound wave using a microphone 288 in the electronic device 201 via an input tool generating an ultrasonic signal, and enables wireless recognition. The electronic device 201 receives a user input from an external device (e.g., a computer or a server 106) connected to the communication module 220 using the communication module 220.

The display 260 (e.g., the display 150) includes a panel 262, a hologram device 264, or a projector 266. The panel 262 may be, for example, a Liquid Crystal Display (LCD), or an Active-Matrix Organic Light-Emitting Diode (AMOLED), etc. The panel 262 may be implemented, for example, such that it is flexible, transparent, or wearable. The panel 262 may be configured as one module together with the touch panel 252. The hologram device 264 may project a three-dimensional image in the air using interferences of light. The projector 266 may project light onto a screen to display an image. The screen may be positioned, for example, inside or outside the electronic device 201. The display 260 may further include a control circuit for controlling the panel 262, the hologram device 264, or the projector 266.

The interface 270 includes, for example, a High-Definition Multimedia Interface (HDMI) 272, a Universal Serial Bus (USB) 274, an optical interface 276, or a D-subminiature (D-sub) 278. The interface 270 may be included, for example, in the communication interface 160 illustrated in FIG. 1A. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280 may convert a sound and an electric signal in dual directions. At least a partial element of the audio module 280 may be included, for example, in the I/O interface 150 illustrated in FIG. 1A. The audio module 280 processes sound information input or output via, for example, a speaker 282, a receiver 284, an earphone 286, or the microphone 288, etc.

The camera module 291 is a device that may capture a still image and a moving picture. T camera module 291 may include one or more image sensors (e.g., a front sensor or a rear sensor), a lens, an Image Signal Processor (ISP), or a flash (e.g., an LED or xenon lamp).

The power management module 295 may manage power of the electronic device 201. The power management module 295 may include, for example, a Power Management Integrated Circuit (PMIC), a charger Integrated Circuit (IC), or a battery or a battery gauge.

The PMIC may be mounted, for example, inside an integrated circuit or an SoC semiconductor. A charging method may be classified into a wired charging method and a wireless charging method. The charging IC charges a battery and prevents introduction of an overvoltage and/or an overcurrent from a charger. The charging IC includes a charging IC for at least one of the wired charging method and the wireless charging method. The wireless charging method may be, for example, a magnetic resonance method, a magnetic induction method, or an electromagnetic wave method, etc., and may additionally include an additional circuit for wireless charging, for example, a circuit such as a coil loop, a resonance circuit, or a rectifier, etc.

The battery gauge measures, for example, a charge of the battery 296, a voltage, a current, or a temperature of the battery while charging the battery. The battery 296 stores or generates electricity, and supplies power to the electronic device 201 using the stored or generated electricity. The battery 296 may include, for example, a rechargeable battery or a solar battery.

The indicator 297 displays a specific state of the electronic device 201 or a portion thereof (e.g., the AP 210), for example, a booting state, a message state, or a charging state, etc. The motor 298 converts an electric signal to mechanical vibration. The electronic device 201 includes a processor (e.g., a GPU) for supporting a mobile TV. The processor for supporting the mobile TV may process media data corresponding to standards, for example, such as Digital Multimedia Broadcasting (DMB), Digital Video Broadcasting (DVB), or a media flow, etc.

Figure 3:
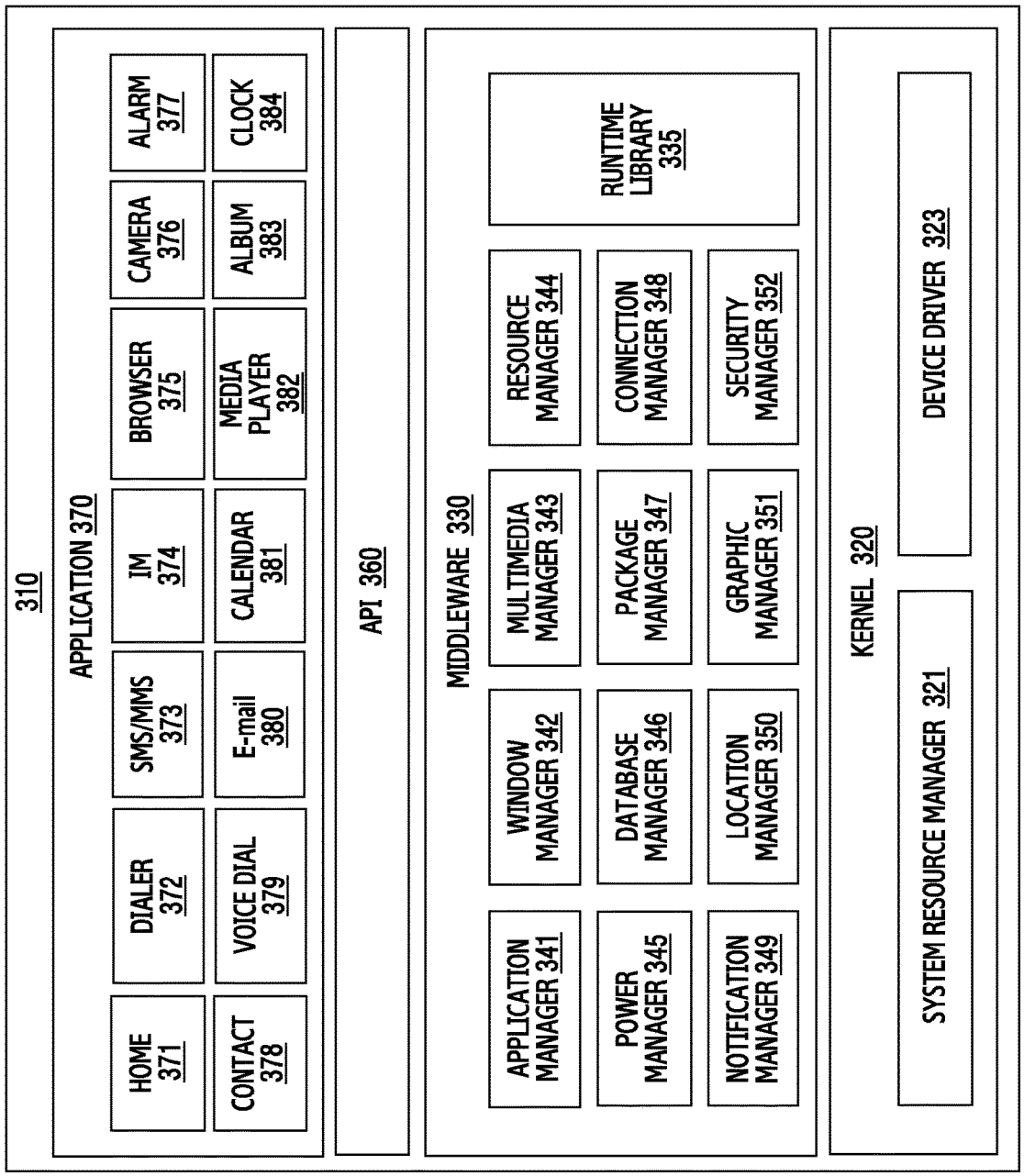
FIG. 3 is a diagram of a program module, according to an embodiment of the present invention.

FIG. 3 is a diagram of a program module 310, according to an embodiment of the present invention.

The program module 310 (e.g., the programming modules 140) may include an OS for controlling resources related to the electronic device (for example, the electronic devices 101, 102, 104, and 201) and/or various applications (e.g., the application programs 147) executed in the OS. The OS may be, for example, Android®, iOS®, Windows®, Symbian®, Tizen®, Bada®, or the like.

The programming module 310 includes a kernel 320, middleware 330, an API 360, and/or applications 370. At least some of the program module 310 may be preloaded in the electronic device or downloaded from the server.

The kernel 320 may include, for example, a system resource manager 331 or a device driver 333. The system resource manager 331 controls, allocates, or collects the system resources. The system resource manager 331 may include a process management unit, a memory management unit, or a file system management unit. The device driver 333 may include, for example, a display driver, a camera driver, a Bluetooth® driver, a shared-memory driver, a USB driver, a keypad driver, a WiFi® driver, an audio driver, or an Inter-Process Communication (IPC) driver.

The middleware 330 provides a function required by the applications 370 in common or provides various functions to the applications 370 through the API 360 so that the applications 370 can efficiently use limited system resources within the electronic device. The middleware 330 includes, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses to add new functions through a programming language while the application 370 is executed. The runtime library 335 performs input/output management, memory management, or a function for an arithmetic function.

The application manager 341 manages, for example, a life cycle of at least one of the applications 370. The window manager 342 may manage GUI resources used by a screen of the electronic device. The multimedia manager 343 determines formats required for the reproduction of various media files and performs an encoding or decoding of the media file by using a codec suitable for the corresponding format. The resource manager 344 manages resources such as a source code, a memory, and a storage space of at least one of the applications 370.

The power manager 345 may operate together with a Basic Input/Output System (BIOS) to manage a battery or power and may provide power information required for the operation of the electronic device. The database manager 346 generates, searches for, or changes a database to be used by at least one of the applications 370. The package manager 347 manages the installation or the updating of applications distributed in the form of package file.

The connectivity manager 348 manages wireless connection of, for example, Wi-Fi® or Bluetooth®. The notification manager 349 n displays or notifies of an event such as an arrival message, proximity notification, and the like in such a way that does not disturb a user. The location manager 350 manages location information of the electronic device. The graphic manager 351 manages graphic effects to be provided to a user and user interfaces related to the graphic effects. The security manager 352 provides all security functions required for system security or user authentication. When the electronic device has a call function, the middleware 330 may further include a telephony manager for managing a voice call function or a video call function of the electronic device.

The middleware 330 may include a middleware module for forming a combination of various functions of the aforementioned components. The middleware 330 may provide modules specialized according to types of operating systems in order to provide differentiated functions. Further, the middleware 330 may dynamically remove some of the existing components or add new components.

The API 360 is, for example, a set of API programming functions, and a different configuration thereof may be provided according to an operating system. For example, Android® or iOS® may provide one API set per platform, and Tizen® may provide two or more API sets per platform.

The applications 370 may include, for example, one or more applications which can provide functions such as home 371, dialer 372, SMS/MMS 373, Instant Message (IM) 374, browser 375, camera 376, alarm 377, contacts 378, voice dialer 379, email 380, calendar 381, media player 382, album 383, clock 384, health care (e.g., measure exercise quantity or blood sugar), or environment information (e.g., atmospheric pressure, humidity, or temperature information).

The applications 370 may include an application ("information exchange application") supporting information exchange between the electronic device (the electronic device 101 and an external electronic device 102 or 104. The information exchange application may include, for example, a notification relay application for transferring predetermined information to an external electronic device or a device management application for managing an external electronic device.

For example, the notification relay application may include a function of transferring, to the external electronic device, notification information generated from other applications of the electronic device 101 (e.g., an SMS/MMS application, an e-mail application, a health management application, or an environmental information application). Further, the notification relay application may receive notification information from, for example, a control device and may provide the received notification information to the user. The device management application may manage (for e.g., install, delete, or update), for example, a function for at least a part of the external electronic device communicating with the electronic device (e.g., turning on/off the external electronic device itself (or some elements thereof) or adjusting brightness (or resolution) of a display), applications executed in the external electronic device, or services provided from the external electronic device (e.g., a telephone call service or a message service).

The applications 370 may include an application (e.g., health management application) designated according to attributes of the external electronic device (e.g., attributes of the electronic device, such as the type of electronic device which corresponds to a mobile medical device). The applications 370 may include an application received from the external electronic devices (e.g., the server 106 or the electronic devices 102, 104). The applications 370 may include a preloaded application or a third party application which can be downloaded from the server 106. The names of the components of the program module 310 according to the embodiment illustrated in FIG. 3 may vary according to the type of operating system.

At least some of the programming module 310 may be implemented by software, firmware, hardware, or a combination of two or more of these components. At least some of the programming module 310 may be implemented (executed) by, for example, the processor (the application program). At least some of the programming module 310 may include, for example, a module, program, routine, sets of instructions, or process for performing one or more functions.

According to various embodiments, at least a portion of an apparatus (e.g., modules or functions thereof) or a method (e.g., operations) according to the present invention may be implemented as an instruction stored in a non-transitory computer-readable storage media, for example, in the form of a programming module. An instruction, when executed by one or more processors (e.g., the processor 120), may allow the one or more processors to perform a function corresponding to the instruction. The computer-readable storage media may be, for example, the memory 130. At least a portion of a programming module may be implemented (e.g., executed) by, for example, the processor 120. At least a portion of the programming module may include, for example, a module, a program, a routine, sets of instructions, or a process, etc. for performing one or more functions.

The non-transitory computer-readable storage media may include a hard disk, a magnetic media such as a floppy disk and a magnetic tape, Compact Disc Read Only Memory (CD-ROM), optical media such as Digital Versatile Disc (DVD), magneto-optical media such as a floptical disk, and a hardware device specially configured for storing and performing a program instruction (e.g., a programming module) such as Read Only Memory (ROM), Random Access Memory (RAM), a flash memory, etc. Also, the program instruction may include not only a machine language code generated by a compiler but also a high-level language code executable by a computer using an interpreter, etc. The above-described hardware device may be configured to operate as one or more software modules in order to perform an operation of the present disclosure, and vice versa.

A module or a programming module according to the present invention may include at least one of the above-described elements, omit a portion thereof, or further include additional other elements. Operations performed by a module, a programming module, or other elements according to the present invention may be executed in a sequential, parallel, or heuristic method. Also, a portion of the operations may be executed in a different sequence, omitted, or other operations may be added.

According to various exemplary embodiments, the first electronic device may include a communication module and a controller, which is configured to request a data list from the second electronic device based on a detection of a state of charge of the battery of the first electronic device, receive a data list corresponding to the request, and request at least some data in the received data list from the second electronic device.

According to various exemplary embodiments, data requested from the second electronic device may be generated based on the data list received from the second electronic device and the data stored in the first electronic device.

According to various exemplary embodiments, the data requested from the second electronic device may be generated based on a pattern of a user. For example, the pattern of the user may include information associated with at least one of a reproduction time of data, a reproduction place of data, and a reproduction frequency of data.

According to various exemplary embodiments, the data requested from the second electronic device may be generated based on information associated with the storage space of the first electronic device.

According to various exemplary embodiments, the controller may be configured to detect a state of charge of the battery of the first electronic device based on context awareness.

According to various exemplary embodiments, the controller may be configured to request a list associated with at least one of recently reproduced data, recently added data, sharing data defined by a user, and frequently reproduced data among the data stored in the second electronic device.

According to various exemplary embodiments, the controller may be configured to request one or more elements of data from the second electronic device based on the first communication method, and receive data corresponding to the request by connecting communication with the second electronic device by the second communicate method.

According to various exemplary embodiments, the controller may be configured to receive data corresponding to the request based on the first communication method when the controller is not connected with the second electronic device by the second communication method.

According to various exemplary embodiments, the controller may determine a data request method based on heating of the first electronic device. For example, the data request method may include at least one of the number of elements of requested data and a data request interval.

According to various exemplary embodiments, the second electronic device may include a communication module, and a controller configured to transmit a data list of the second electronic device to the first electronic device based on a state of the second electronic device in response to the request of the first electronic device for the data list, and transmit data to the first electronic device in response to the request of the first electronic device.

According to various exemplary embodiments, when the controller receives a data request based on the first communication method, the controller performs a second communication connection with the first electronic device before transmitting the data to the first electronic device, and when the controller is connected with the first electronic device based on the second communication connection, the controller transmits the data based on the second communication, and when the controller is not connected with the first electronic device based on the second communication connection, the controller transmits the data based on the first communication.

According to various exemplary embodiments, the controller may be configured to transmit a data list based on a satisfaction of at least one condition among a condition that the second electronic device is being charged, a condition that a battery is in a charged state with a threshold value or more, and a condition that a battery is in a chargeable state.

According to various exemplary embodiments, the controller may be configured to transmit the data list based on that a movement of the second electronic device satisfies a condition.

According to various exemplary embodiments, the controller may be configured to transmit data corresponding to the request of the first electronic device to the third electronic device.

According to various exemplary embodiments, a data sharing device may include the first electronic device, which requests a data list from a second electronic device in response to detection of charging, receives the data list corresponding to the request, and requests one or more elements of data from the second electronic device, and a second electronic device, which transmits a data list of the second electronic device to the first electronic device based on a state of the second electronic device in response to the request of the first electronic device for the data list, and transmits data to the first electronic device in response to the request of the first electronic device.

According to various exemplary embodiments, the second electronic device may be configured to transmit at least one of a predefined list, a list satisfying a condition, and a stored data reproduction list to the first electronic device in response to the request for the data list.

According to various exemplary embodiments, the first electronic device may be configured to request one or more elements of data to the second electronic device based on information associated with at least one of data stored in the first electronic device, a data storage space, a data reproduction pattern, and context awareness, and the data list received from the second electronic device.

Figure 4:
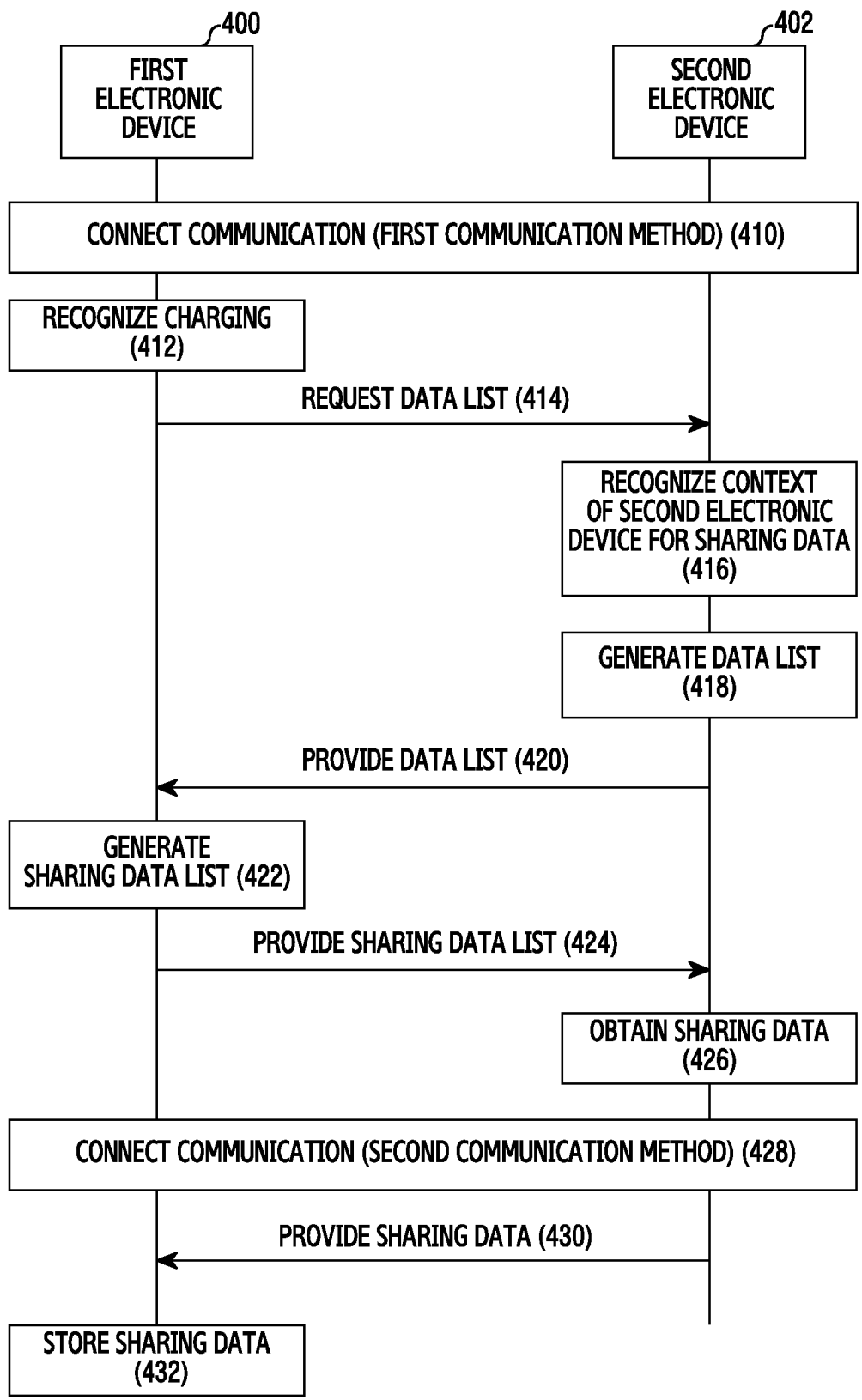
FIG. 4 is a signaling diagram illustrating a method for data sharing, according an embodiment of the present invention.

FIG. 4 is a signaling diagram illustrating a method for data sharing, according an embodiment of the present invention.

More particularly, FIG. 4 illustrates a system including a first electronic device 400 and a second electronic device 402. The first electronic device 400 may be a wearable device which may be paired with the second electronic device 402 to transceive data, and the second electronic device 402 may be an electronic device, such as a smart phone, providing a mobile communication function. For example, the first electronic device 400 may correspond to the first electronic device 101 of FIG. 1C, and the second electronic device 402 may correspond to the second electronic device 102 of FIG. 1C.

The first electronic device 400 performs a communication connection (at 410) with the second electronic device 402 by a first communication method. For example, the first communication method may use Bluetooth® wireless communication protocol.

When the first electronic device 400 recognizes charging (at 412), for example, recognizes a contexts in which a battery of the electronic device 400 is charged according to a connection with a charging stand or a charging device, the first electronic device 400 may request a data list from the second electronic device 402 (at 414). For example, the request for the data list of the second electronic device 402 may include a notification of a charging state of the first electronic device 400 to the second electronic device 402. The first electronic device 400 may request a list for specific data. For example, the first electronic device 400 may request a list associated with recently reproduced data, recently added data, sharing data defined by a user, and frequently reproduced data from the second electronic device 402.

The second electronic device 402 recognizes a context of the second electronic device 402 for sharing data based on the reception of the request of the first electronic device 400 for the data list (at 416). For example, the second electronic device 402 may confirm whether a context for sharing data of the first electronic device 400 is satisfied based on a predetermined condition.

The second electronic device 402 generates a data list based on the satisfaction of the condition for sharing data (at 418). The data list may be associated with data stored in the second electronic device 402 or sharable data among the stored data. For example, the second electronic device 402 generates a data list corresponding to the request of the first electronic device 400. The second electronic device 402 may generate a data list including a data name, a data size, Metadata information (e.g., header information) about data, a data generation time, or the like.

The second electronic device 402 transmits the generated data list to the first electronic device 400 in response to the request the first electronic device 400 for the data list (at 420).

The first electronic device 400 selects one or more elements of data in the data list received from the second electronic device 402 to select sharing data, generates a list, for example, a sharing data list, associated with the selected sharing data (at 422), and provides the second electronic device 402 with the generated list (at 424).

The second electronic device 402 obtains sharing data, which is to be transmitted to the first electronic device 400, based on the sharing data list received from the first electronic device 400 (at 426). The second electronic device 402 transmits the sharing data corresponding to the request to the first electronic device 400 communication connected (at 428) with the second electronic device 402 based on the second communication method (at 430).

For example, the first electronic device 400 generates a sharing data list, activates an operation of a communication module supporting a second communication method (Wi-Fi®) having better transmission performance than that of the first communication method, and connects communication with the second electronic device 402 based on the second communication method. Accordingly, when the connection with the first electronic device 400 is completed based on the second communication method, the second electronic device 402 transmits data based on the second communication method, and when the second electronic device 402 is not connected with the first electronic device 400 based on the second communication method, the second electronic device 402 transmits data based on the first communication method.

The first electronic device 400 stores the sharing data received from the second electronic device 402 (at 432).

Figure 5:
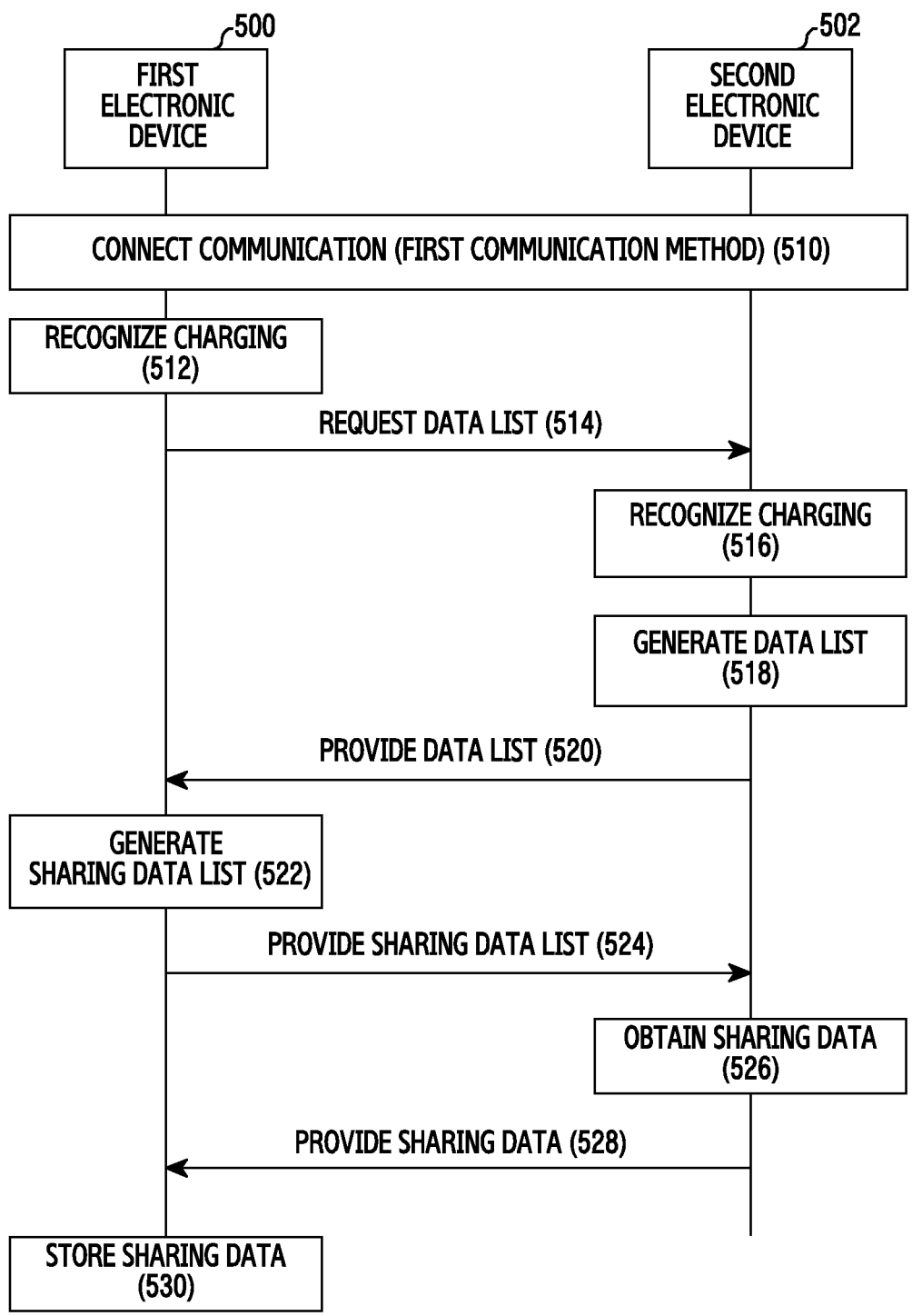
FIG. 5 is a signaling diagram illustrating a method for data sharing, according an embodiment of the present invention.

FIG. 5 is a signaling diagram illustrating a method for data sharing, according an embodiment of the present invention.

More particularly, FIG. 5 illustrates a system including a first electronic device 500 and a second electronic device 502. The first electronic device 500 may be a wearable device which may be paired with the second electronic device 502 to transceive data, and the second electronic device 502 may be an electronic device, such as a smart phone, providing a mobile communication function. For example, the first electronic device 500 may correspond to the first electronic device 101 of FIG. 1C, and the second electronic device 502 may correspond to the second electronic device 102 of FIG. 1C. In the description related to FIG. 5, description of corresponding or similar elements to those in FIG. 4 will be omitted.

The first electronic device 500 performs a communication connection with the second electronic device 502 by a first communication method (at 510).

When the first electronic device 500 recognizes charging (at 512), the first electronic device 500 requests a data list from the second electronic device 502 (at 514), and the second electronic device 402 recognizes a state of charge of the second electronic device 502 based on the reception of the request of the first electronic device 400 for the data list (at 516). The state of charge may be a state in which the second electronic device 402 is charged with external power or is in a charged state that is greater than or equal to a predetermined value.

The second electronic device 502 recognizing the charging generates a data list corresponding to the request of the first electronic device 500 (at 518), and transmits the generated data list to the first electronic device 500 (at 520).

The first electronic device 400 selects one or more elements of data in the data list received from the second electronic device 502 to select sharing data, generates a list, for example, a sharing data list, associated with the selected sharing data (at 522), and provides the second electronic device 502 with the generated list (at 524).

The second electronic device 502 obtains sharing data, which is to be transmitted to the first electronic device 500, based on the sharing data list received from the first electronic device 500 (at 526), and transmits the obtained data to the first electronic device 400 (at 528). For example, the second electronic device 402 transmits the sharing data based on the pre-connected first communication method or the sharing data based on a second communication method.

The first electronic device 400 stores the sharing data received from the second electronic device 402 (at 530).

Figure 6:
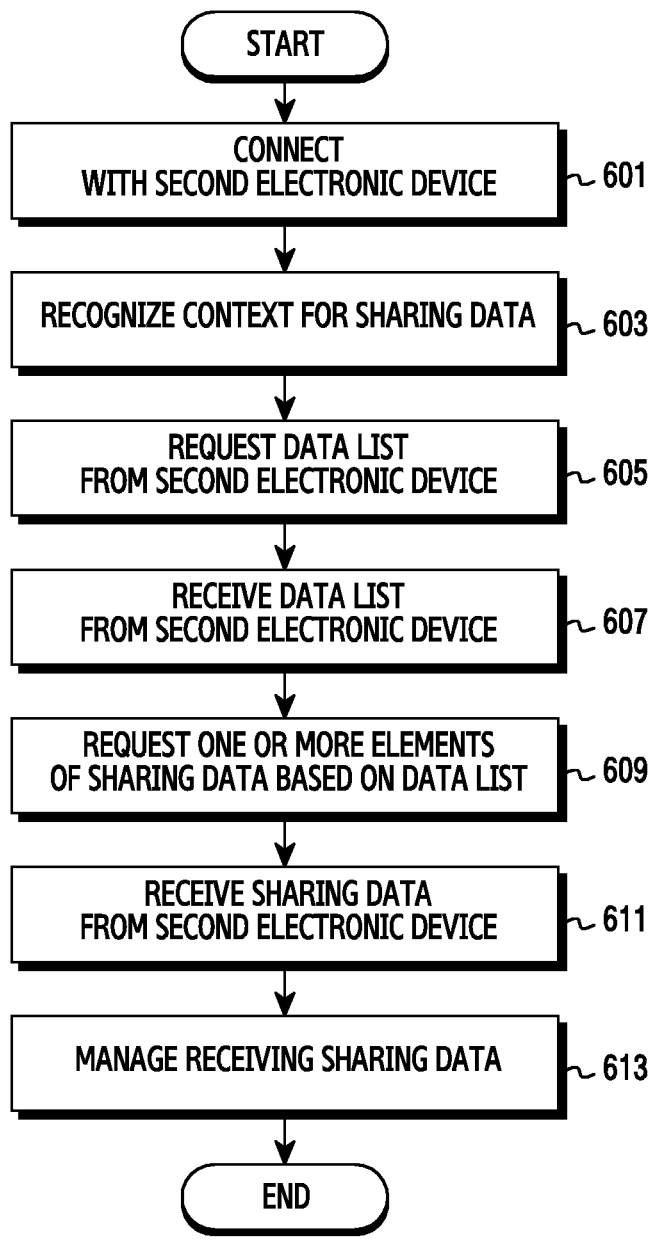
FIG. 6 is a flowchart illustrating a method of a first electronic device, according to an embodiment of the present invention.

FIG. 6 is a flowchart illustrating a method of a first electronic device, according to an embodiment of the present invention.

Referring to FIG. 6, the first electronic device may be a wearable device paired with a second electronic device to transceive data, such as the first and second electronic devices described above with reference to FIGS. 4 and 5.

The first electronic device performs a communication connection with the second electronic device, in step 601, using Bluetooth®.

The first electronic device recognizes a context for sharing data in step 603. The context for sharing data may be associated with a state of charge and a state of battery. For example, the context for sharing data may be a state in which a battery of the first electronic device is being charged, a state in which a state of charging of a battery is greater than or equal to a predetermined value, and the like.

The first electronic device requests a data list from the second electronic device in response to the recognition of the context for sharing data. For example, the request for the data list may be a notification of a context for sharing data.

The first electronic device receives a list of data stored in the second electronic device from the second electronic device in step 607.

The first electronic device selects at least one element of sharing data in the data list received from the second electronic device and requests the selected sharing data from the second electronic device in step 609. For example, the first electronic device requests all of the data included in the list from the second electronic device in a state where a storage space for storing all of the data included in the data list is secured, i.e. a state where there is ample storage space for storing all of the data. For another example, the first electronic device requests some of the data among the data included in the list from the second electronic device in a state where a storage space for storing all of the data included in the data list is not secured, i.e. a state where there is insufficient storage space for storing all of the data. In this instance, the first electronic device deletes some of the pre-stored data, and requests all of the data included in the list from the second electronic device.

The first electronic device receives sharing data from the second electronic device in step 611 and manages the received data in step 613. The reception of the received data may include storing the received data in a storage module, updating a list of stored data based on the received data, and the like.

The first electronic device receives data from the second electronic device by using the first communication method. The first electronic device receives data from the second electronic device by using the second communication method.

Figure 7:
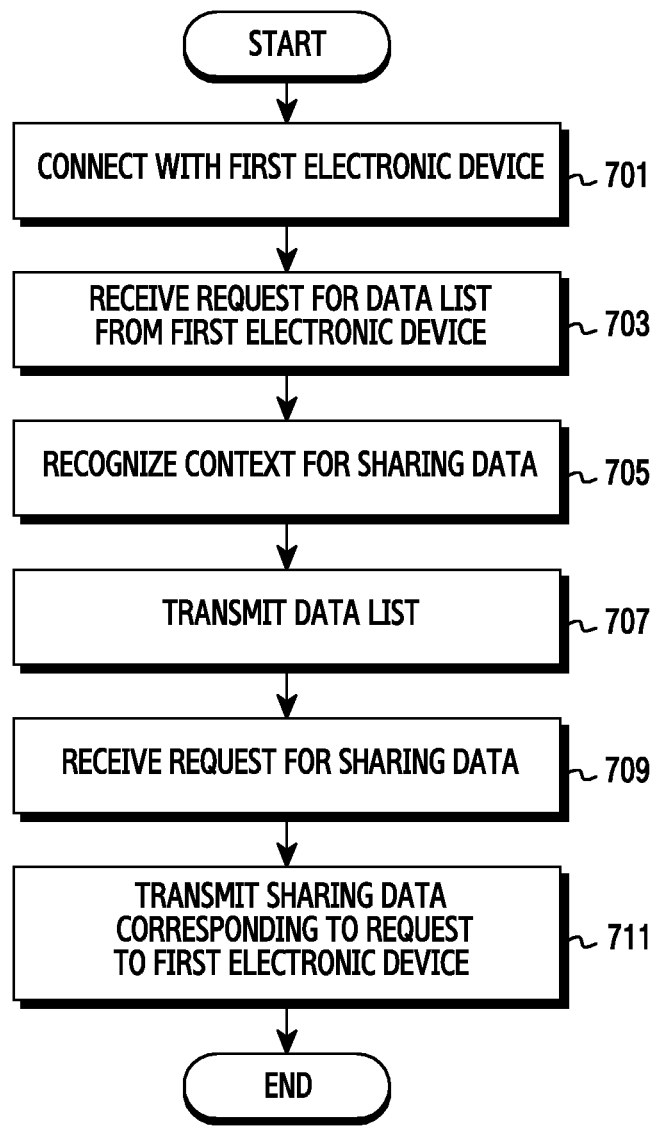
FIG. 7 is a flowchart illustrating a method of a second electronic device, according to an embodiment of the present invention.

FIG. 7 is a flowchart illustrating a method of a second electronic device, according to an embodiment of the present invention.

Referring to FIG. 7, the second electronic device may be an electronic device, such as a smart phone, paired with a first electronic device to transceive data, and provide a mobile communication function.

The second electronic device performs a communication connection with the first electronic device, in step 701, using Bluetooth®.

The second electronic device receives a request of the first electronic device for a data list in step 703. The second electronic device determines whether the first electronic device satisfies a context for sharing data based on the request of the first electronic device.

The second electronic device recognizes the context, in which the second electronic device may also share data, together with the first electronic device in step 705.

The second electronic device recognizing the context for sharing data transmits a data list to the first electronic device in step 707, and receives a request of the first electronic device for the sharing data in step 709.

The second electronic device obtains the sharing data corresponding to the request of the first electronic device from the stored data and transmits the obtained sharing data to the first electronic device in step 711.

Figure 8:
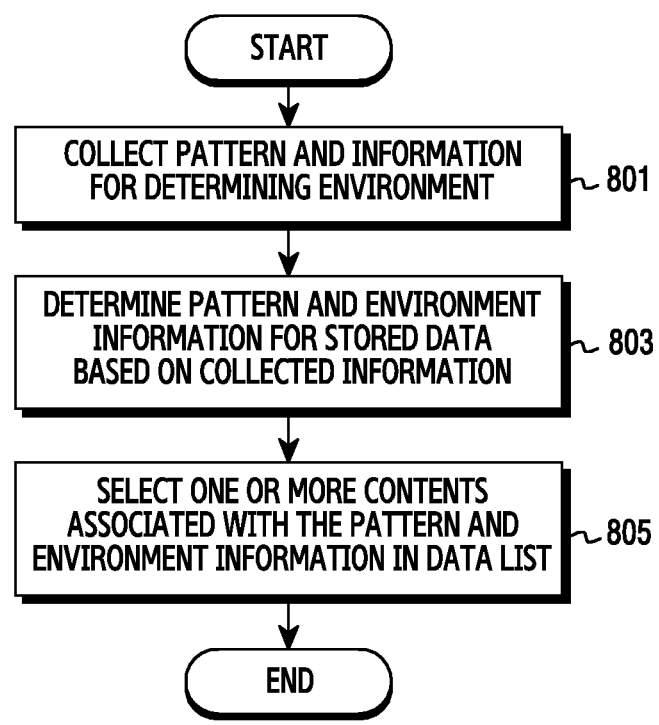
FIG. 8 is a flowchart illustrating a method for data selection of the first electronic device, according to an embodiment of the present invention.

FIG. 8 is a flowchart illustrating a method of selecting data of a first electronic device, according to an embodiment of the present invention.

The first electronic device selects data to be shared among the data stored in the second electronic device in step 801. The first electronic device collects information for determining information about a pattern of a user of the first electronic device and environment information. For example, the pattern information may be information associated with a data execution frequency, a kind of executed data, and the like, and the environment information may be an environment reproducing data, an environment storing data, and the like. For example, when data is a music file, the first electronic device collects pattern information for confirming a music file and a genre to which a user frequently listens, a recently listened music file, a genre of a recently file, and the like. The first electronic device collects environment information for confirming a space, in which a music file is reproduced, a time, a music file storage capacity, and the like.

The first electronic device determines the pattern of the user and the environment information about the stored data based on the collected information in step 803, and the first electronic device selects one or more elements of data associated with the pattern of the user or the environment information in the sharing data list received from the second electronic device in step 805.

Figure 9:
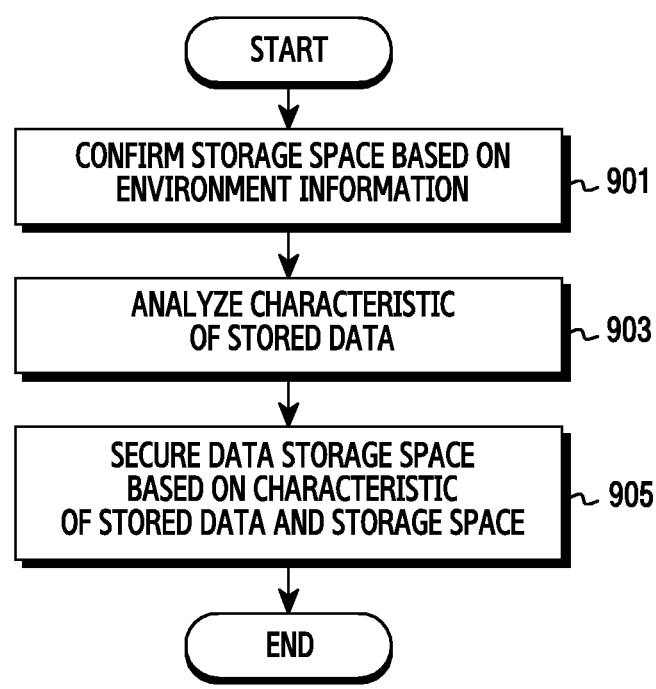
FIG. 9 is a flowchart illustrating a method for data selection of the first electronic device, according to an embodiment of the present invention.

FIG. 9 is a flowchart illustrating a method of selecting data of a first electronic device, according to an embodiment of the present invention.

The first electronic device selects data to be shared among the data stored in a second electronic device. The first electronic device selects data based on a storage space of the first electronic device.

The first electronic device confirms a data storage space in step 901.

The first electronic device analyzes a characteristic of stored data in step 903. For example, when the stored data is a music file, the first electronic device analyzes a characteristic associated with a genre, a singer's name, a file name, and the like for the stored music files.

The first electronic device selects data based on the characteristic of the stored data and the storage space in step 905.

For example, the first electronic device secures the storage space by maintaining data, which the user frequently uses, and deleting other data based on the characteristic of the data, and selects data to be shared according to the secured storage space.

Figure 10:
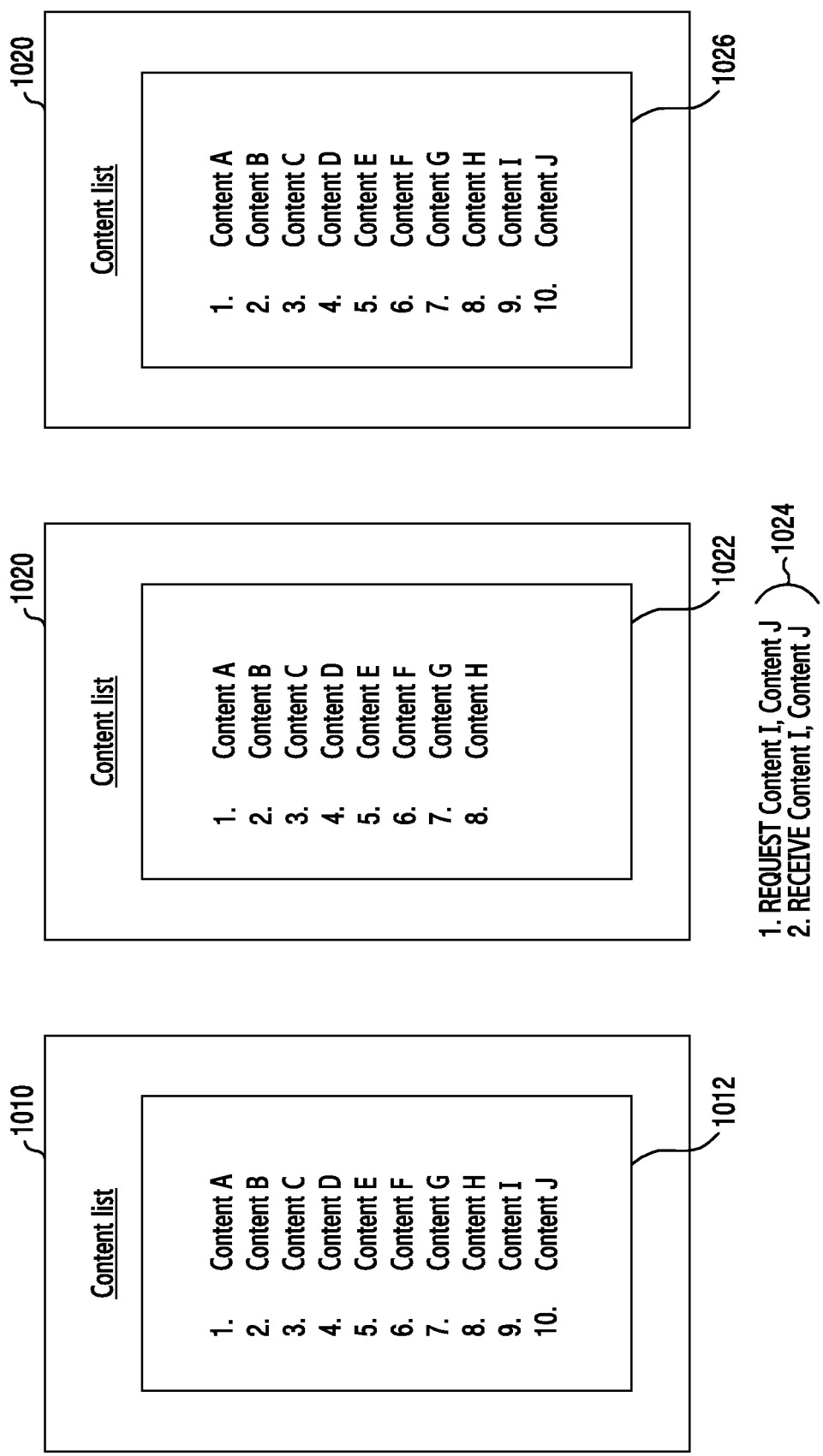
FIG. 10 is a diagram illustrating a data selection process of the first electronic device, according to an embodiment of the present invention.

FIG. 10 is a diagram illustrating a data selection process of the first electronic device, according to an embodiment of the present invention.

Referring to FIG. 10, when the first electronic device determines a context satisfying a data sharing execution condition, the first electronic device receives information (e.g., a sharing data list) associated with sharing data stored in a second electronic device.

The first electronic device compares information associated with data stored in the first electronic device with information associated with data received from the second electronic device to select data to be shared.

The first electronic device generates information associated with the stored data based on reproduction of data. For example, when the data is a music file, the first electronic device generates a list of music files, to which a user frequently listens, a list of recently listened music files, a list of recently added music files, and the like.

The first electronic device 1020 uses a list 1022 including contents A to contents H as the information associated with the stored data and compares the list 1022 with a list 1012 including contents A to contents J received from the second electronic device 1010 to select data to be shared.

The first electronic device 1020 selects only the data, which is not included in the list of the first electronic device 1020, but is included in the list 1012 received from the second electronic device 1010 (that is, non-overlapping data) as data to be shared. For example, the first electronic device 1020 compares the list 1012 of the second electronic device 1010 with the list 1022 of the first electronic device 1020 and confirms that contents I and contents J stored in the second electronic device 1010 are not stored in the first electronic device 1020. Accordingly, the first electronic device 1020 selects the contents I and the contents J as the data to be shared and requests the selected data from the second electronic device 1010, and receives the data corresponding to the request from the second electronic device 1010 and stores the received data (as indicated by reference number 1024).

In addition, the first electronic device 1020 updates a list of the stored data. That is, the data list 1022 of the first electronic device 1020 including the contents A to the contents H may be updated to the data list including the contents A to the contents J (as shown in the contents list 1026).

Figure 11:
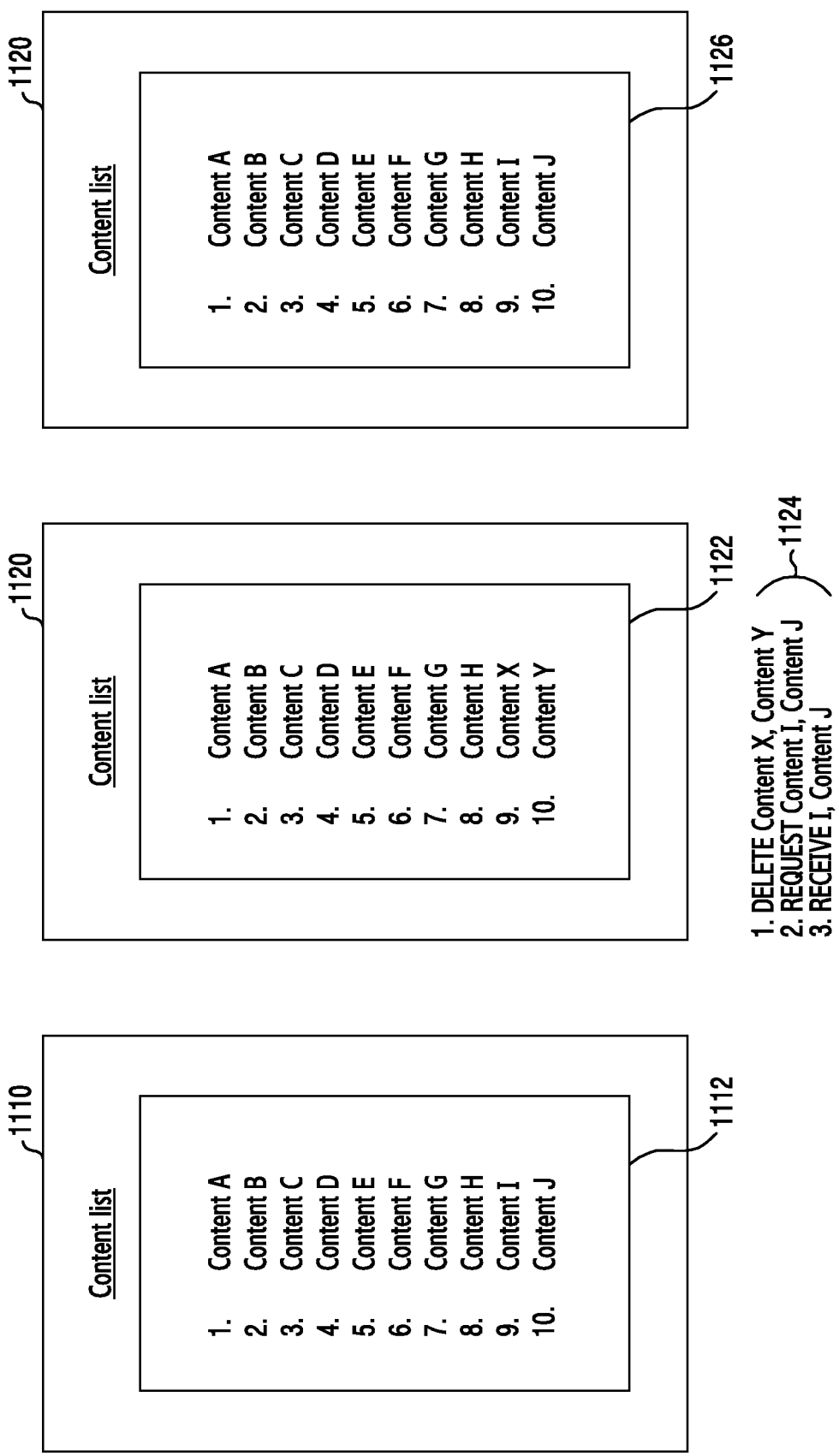
FIG. 11 is a diagram illustrating a data selection process of the first electronic device, according to an embodiment of the present invention.

FIG. 11 is a diagram illustrating a data selection process of the first electronic device, according to an embodiment of the present invention. In the description related to FIG. 11, description of corresponding or similar elements to those in FIG. 10 will be omitted.

When a first electronic device 1120 determines a context satisfying a data sharing execution condition, the first electronic device 1120 receives information (e.g., a sharing data list) associated with sharing data stored in a second electronic device 1110.

For example, the first electronic device 1120 uses a list 1122 including contents A to contents H, and contents X and Y as information associated with stored data and receives a list 1112 including contents A to contents J from the second electronic device 1110.

The first electronic device 1120 compares the two lists and selects the data included only in the list received from the second electronic device 1110 as sharing data.

For example, the first electronic device 1120 requests the contents I and the contents J from the second electronic device 1110 and receives the requested contents I and J.

When a storage space of the first electronic device 1120 is insufficient, the first electronic device 1120 secures a storage space by deleting some of the stored data and requests the contents I and J from the second electronic device 1110 and receives the requested contents I and J. For example, the first electronic device 1120 deletes the data of the first electronic device 1120, which is not included in the list received from the second electronic device 1110. For example, the first electronic device 1120 secures a storage space capable of storing the contents to be received from the second electronic device 1110.

FIG. 11 illustrates a situation where the first electronic device 1120 secures the storage space by deleting the contents X and contents Y, which are not stored in the second electronic device 1110 and requests the contents I and the contents J from the second electronic device 1110 and receives the requested contents I and J (as indicated by reference number 1124).

The first electronic device 1120 receives data corresponding to the request from the second electronic device 1110 and stores the received data, and updates a list of the stored data. That is, the data list of the first electronic device 1120 including the contents A to the contents H, and the contents X and Y may be updated to the data list including the contents A to the contents J (as shown in the contents list 1126).

Figure 12:
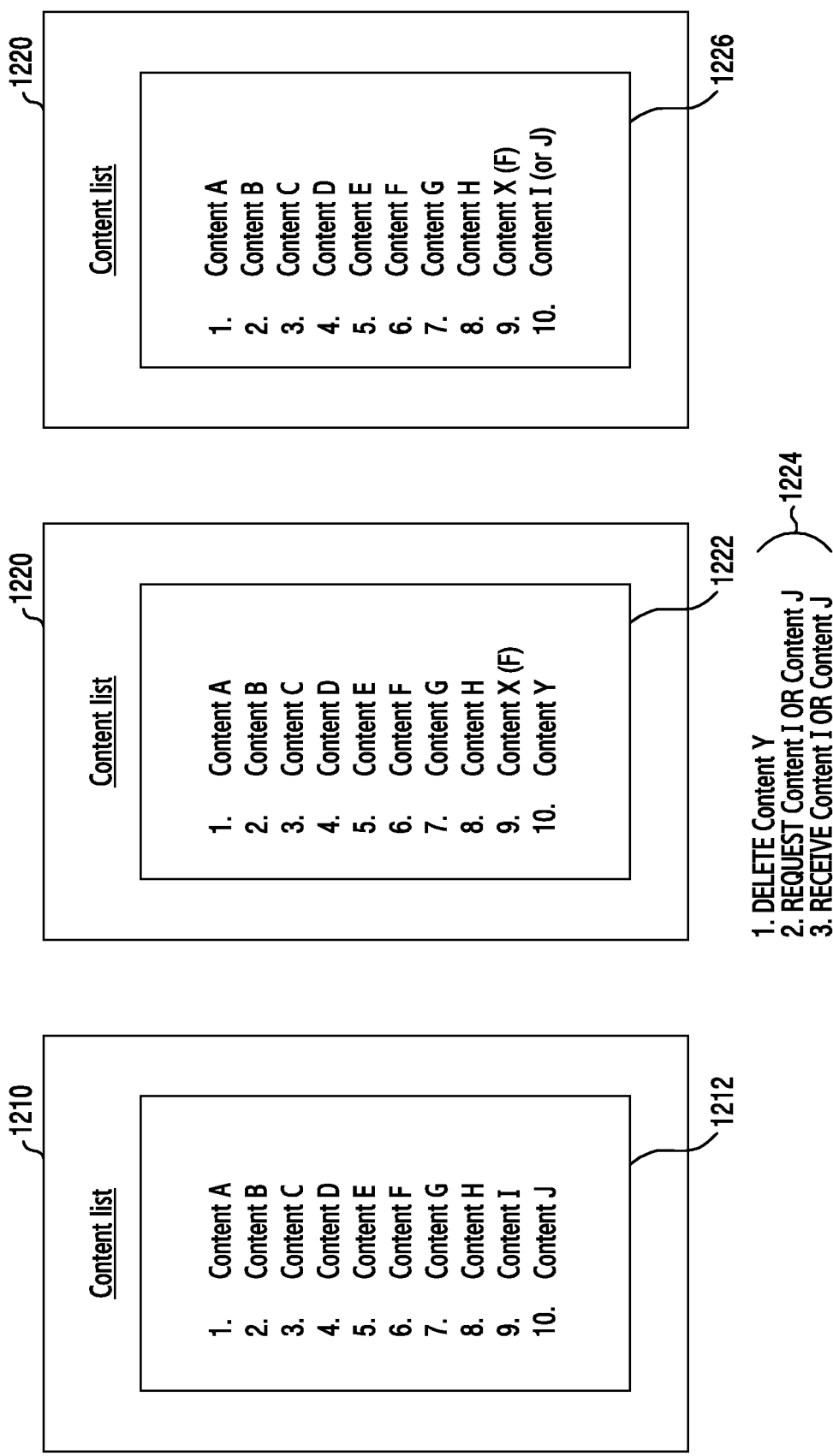
FIG. 12 is a diagram illustrating a data selection process of the first electronic device, according to an embodiment of the present invention.

FIG. 12 is a diagram illustrating a data selection process of the first electronic device, according to an embodiment of the present invention. In the description related to FIG. 12, description of corresponding or similar elements to those in FIG. 10 will be omitted.

When a first electronic device 1220 determines a context satisfying a data sharing execution condition, the first electronic device 1210 receives information (e.g., a sharing data list) associated with sharing data stored in a second electronic device 1210.

When a storage space of the first electronic device 1220 is insufficient for sharing data, the first electronic device 1220 secures a storage space by deleting some of the stored data and requests the contents I and J from the second electronic device 1210 and receives the requested contents I and J. For example, the first electronic device 1220 deletes the data of the second electronic device 1210, which is not included in the list received from the first electronic device 1220. In this case, the first electronic device 1120 secures a storage space by deleting data, which is not limited to be deleted, from the stored data.

FIG. 12 illustrates a situation where the first electronic device 1220 secures the storage space by deleting the contents Y, instead of the contents X set as a bookmark F, among the contents X and the contents Y which are not stored in the second electronic device 1210, and requests the contents I or the contents J from the second electronic device 1210 and receives the requested contents I or J (as shown by reference number 1224).

The first electronic device 1220 receives data corresponding to the request from the second electronic device 1210 and stores the received data, and updates a list of the stored data. That is, the data list of the first electronic device 1220 including the contents A to the contents H, the contents X, and the contents Y may be updated to the data list including the contents A to the contents H, the content X, and the contents I (or the contents J) (as shown in the content list 1226).

Figure 13:
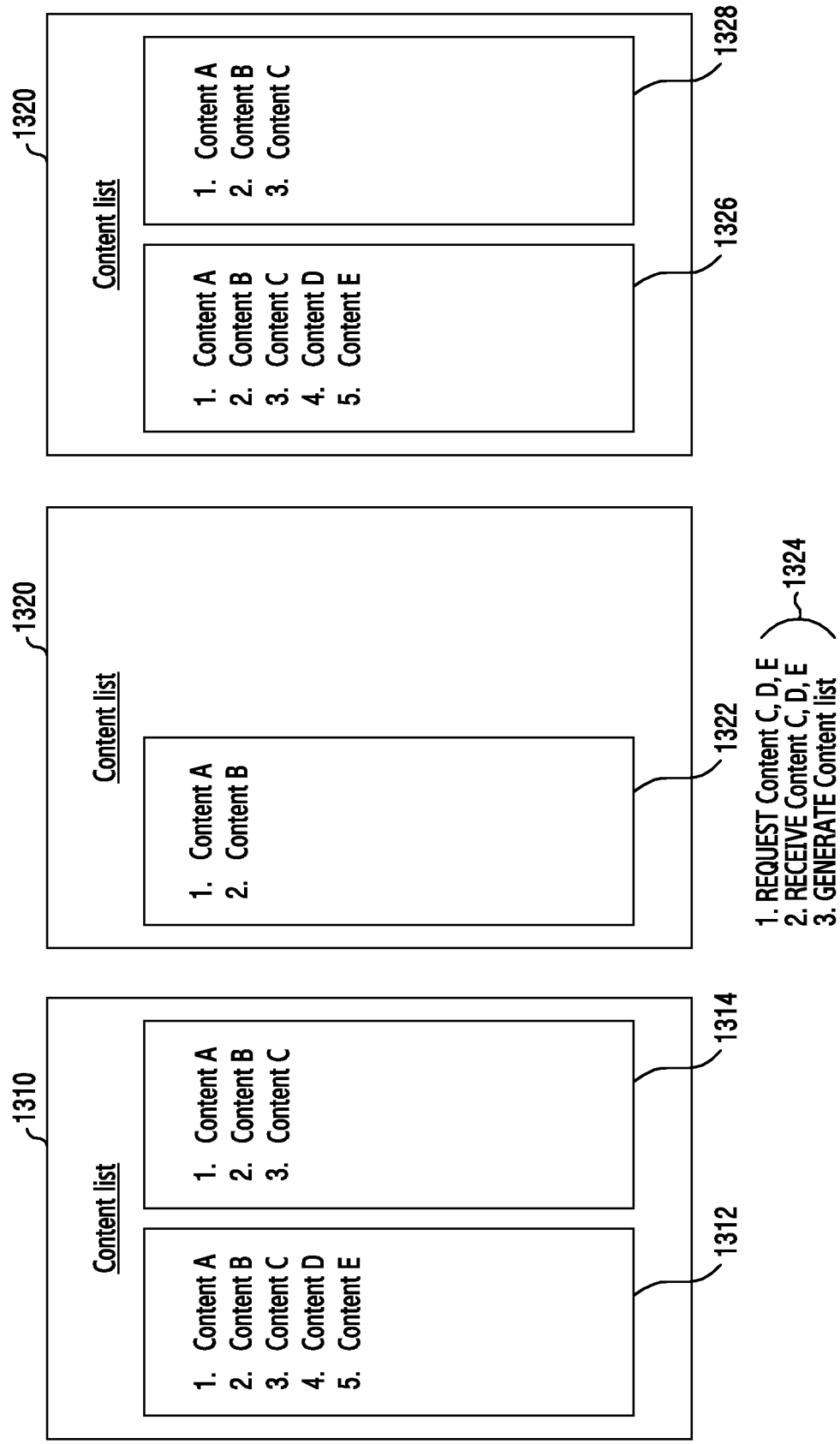
FIG. 13 is a diagram illustrating a data selection process of the first electronic device, according to an embodiment of the present invention.

FIG. 13 is a diagram illustrating a data selection process of the first electronic device, according to an embodiment of the present invention. In the description related to FIG. 13, description of corresponding or similar elements to those in FIG. 10 will be omitted.

When a first electronic device 1320 determines a context satisfying a data sharing execution condition exists, the first electronic device 1320 receives information (e.g., a sharing data list) associated with sharing data stored in a second electronic device 1310.

The first electronic device 1320 receives a plurality of data lists from the second electronic device 1310. The data list received from the second electronic device 1310 may include a first list 1312 including contents A to contents E and a second list 1314 including contents A to contents C.

The first electronic device 1320 selects only the data, which is not included in the list 1322 of the first electronic device 1320, but is included in the list received from the second electronic device 1310 as data to be shared.

For example, the first electronic device 1320 compares the list of the second electronic device 1310 and the list of the first electronic device 1320 and requests the contents C, the contents D, and the contents E stored in the second electronic device 1310 from the second electronic device 1310.

The first electronic device 1320 receives the data corresponding to the request from the second electronic device 1310 and stores the received data, and updates a list of the stored data. In this case, the first electronic device 1320 generates a plurality of lists, which is the same as the list of the second electronic device 1310, based on the stored data (as shown by reference number 1324). For example, the list 1322 of the first electronic device 1320 including the contents A and the contents B may be updated as a first list 1326 including the contents A to the contents E and a second list 1328 including the contents A to the contents C.

Figure 14:
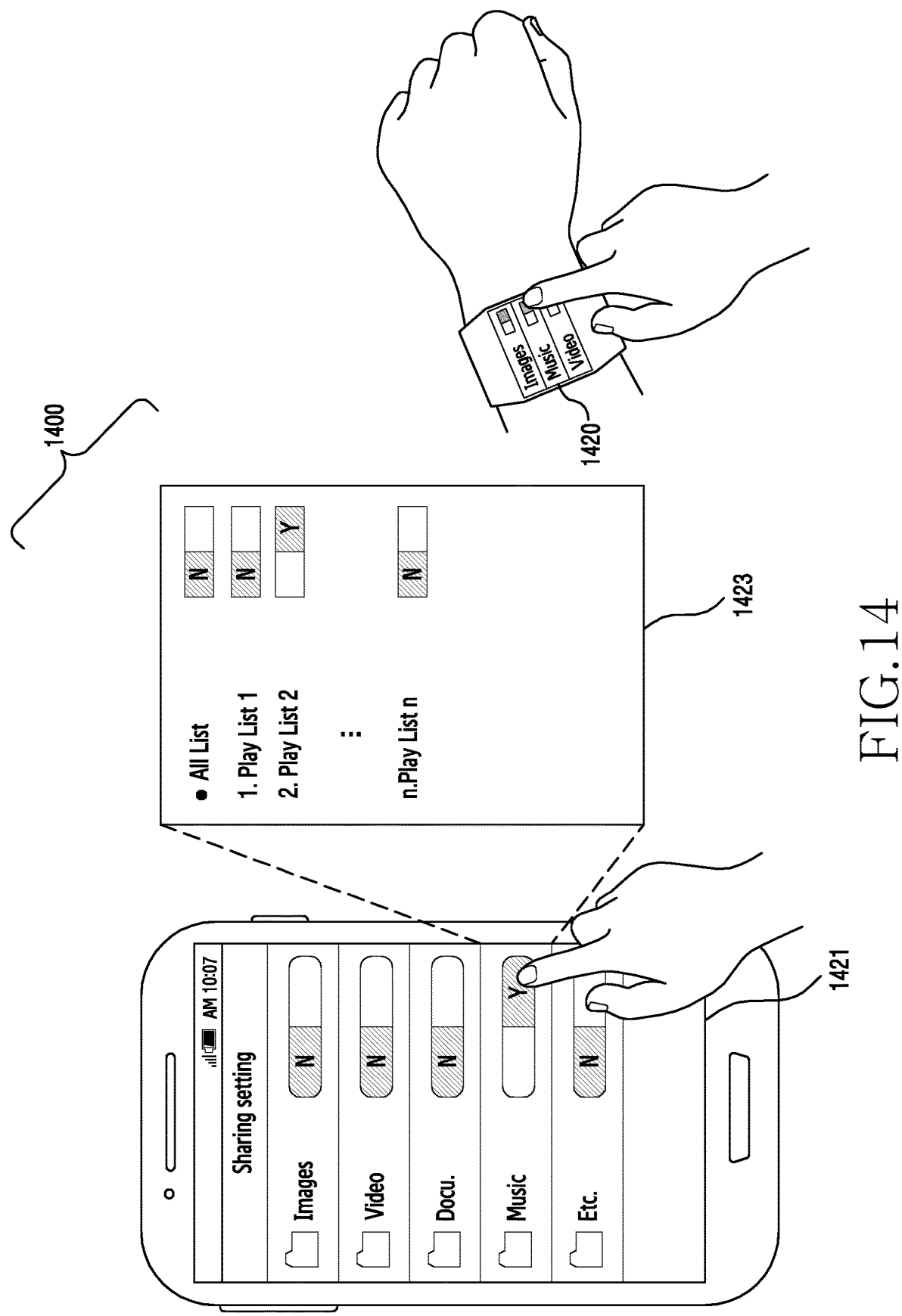
FIG. 14 is a diagram illustrating a shared data setting process of an electronic device, according to an embodiment of the present invention.

FIG. 14 is a diagram illustrating a shared data setting process of an electronic device, according to an embodiment of the present invention.

Referring to FIG. 14, when a first electronic device 1420 determines a context satisfying a data sharing execution condition, the first electronic device 1420 receives information (e.g., a sharing data list) associated with sharing data stored in a second electronic device 1421.

The second electronic device 1421 pre-defines information associated with the stored sharing data. The second electronic device 1421 manages a plurality of lists and provides the first electronic device 1420 with a sharing list defined by a user. FIG. 14 illustrates a situation 1400 in which, in a state where a data list is defined according to each kind of data, reproduction list 2 among the lists associated with a music file is defined as a sharing data list according to an input of a user (the input of the user is indicated by reference number 1423).

The first electronic device 1420 selects data to be shared in the list of the second electronic device 1421. For example, the second electronic device 1421 provides the first electronic device 1420 with a plurality of lists, and the first electronic device 1420 defines the list of the second electronic device 1421 corresponding to a selection of the user as sharing data and requests the sharing data of the second electronic device from the second electronic device 1421.

Figure 15A:
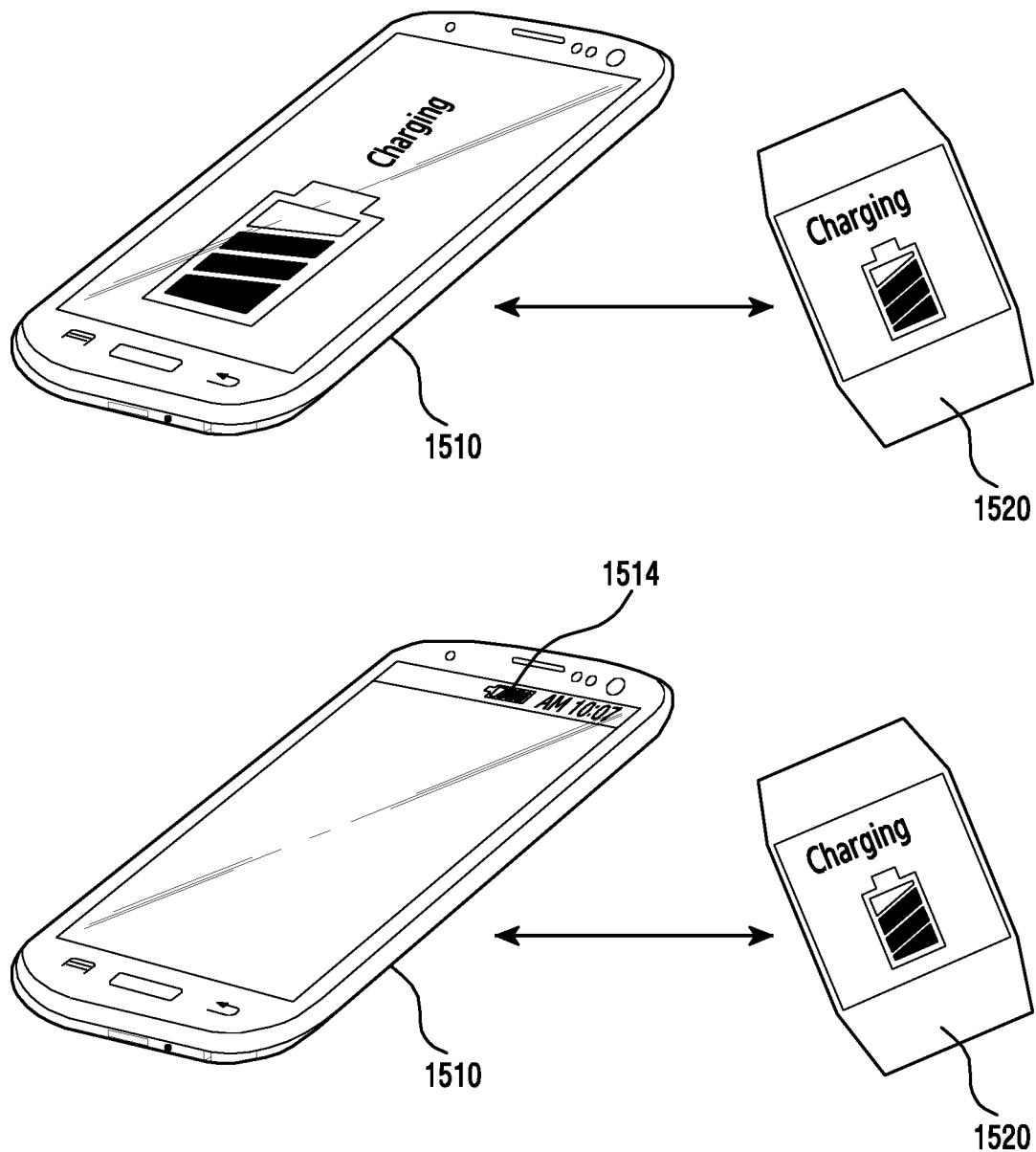

FIGS. 15A-15C are diagrams illustrating a situation in which a first electronic device and a second electronic device share data, according to an embodiment of the present invention.

Referring to FIG. 15A, a second electronic device 1510 or a first electronic device 1520 may execute a data sharing operation based on a charging context. For example, a charging context may be defined as a sharing execution condition for the first electronic device 1520 and the second electronic device 1510. In this case, the data sharing operation may be executed in a context in which all of the first electronic device 1520 and the second electronic device 1510 are being charged.

The second electronic device 1510 or the first electronic device 1520 executes the data sharing operation based on a charge quantity of a battery and the charging context. For example, a charge quantity of the battery may be defined as the sharing execution condition for the second electronic device 1510, and a charging context may be defined as the sharing execution condition for the first electronic device 1520. In this case, when the first electronic device 1520 is being charged, and the second electronic device 1510 is not being charged, but a charge quantity of a battery of the second electronic device 1512 is sufficient (as indicated by reference number 1514), the data sharing operation may be executed.

Referring to FIG. 15B, a second electronic device 1516 or the first electronic device 1520 may execute the data sharing operation based on a charge quantity of a battery, a charging context, and movement information. For example, a charge quantity of the battery and a movement may be defined as the sharing execution condition for the second electronic device 1516, and a charging context may be defined as the sharing execution condition for the first electronic device 1520. In this case, when the first electronic device 1520 is being charged, and the second electronic device 1516 is not being charged, but a charge quantity of a battery of the second electronic device 1516 is sufficient, the data sharing operation may be executed. However, when a movement of the second electronic device 1516, of which a movement is set to as the sharing execution condition, is detected, the data sharing operation may not be executed.

The second electronic device 1516 may be a device, such as a Personal Computer (PC), which does not include a battery, and in this case, a condition of sharing data with the first electronic device 1520 by the second electronic device 1516 may be various conditions, such as a memory state, a content state, a security state, and a location of the second electronic device 1516.

The second electronic device 1516 or a first electronic device 1522 executes a data sharing operation based on an input of a user. For example, an input of a user may be defined as a sharing execution condition for the first electronic device 1522, and when the input 1524 of the user is detected by the first electronic device 1522, the data sharing operation may be executed.

Referring to FIG. 15C, a second electronic device 1534 or a first electronic device 1536 may execute a data sharing operation based on context awareness. For example, in a case where a context, in which the second electronic device 1534 or the first electronic device 1536 are located at home, is defined as the sharing execution condition for the second electronic device 1534 or the first electronic device 1536, when the second electronic device 1534 or the first electronic device 1536 is located at another place 1530 (for example, an office), not at home, even though satisfying a state, in which the second electronic device 1534 or the first electronic device 1536 is being charged (as indicated by reference number 1532), the data sharing operation may not be executed.

When the second electronic device 1534 or the first electronic device 1536 is located at home 1540 while satisfying a state in which the second electronic device 1534 or the first electronic device 1536 is being charged (as indicated by reference number 1542), the data sharing operation may be executed.

In a case where a context in which the second electronic device 1534 or the first electronic device 1536 is located at home and a user sleeps is defined as the sharing execution condition for the second electronic device 1534 or the first electronic device 1536, when a sleep time (as indicated by reference number 1548) of the user is not satisfied even though the second electronic device 1534 or the first electronic device 1536 is located 1540 at home while satisfying the state in which the second electronic device 1534 or the first electronic device 1536 is being charged (as indicated by reference number 1552), the data sharing operation may not be executed.

Figure 16:
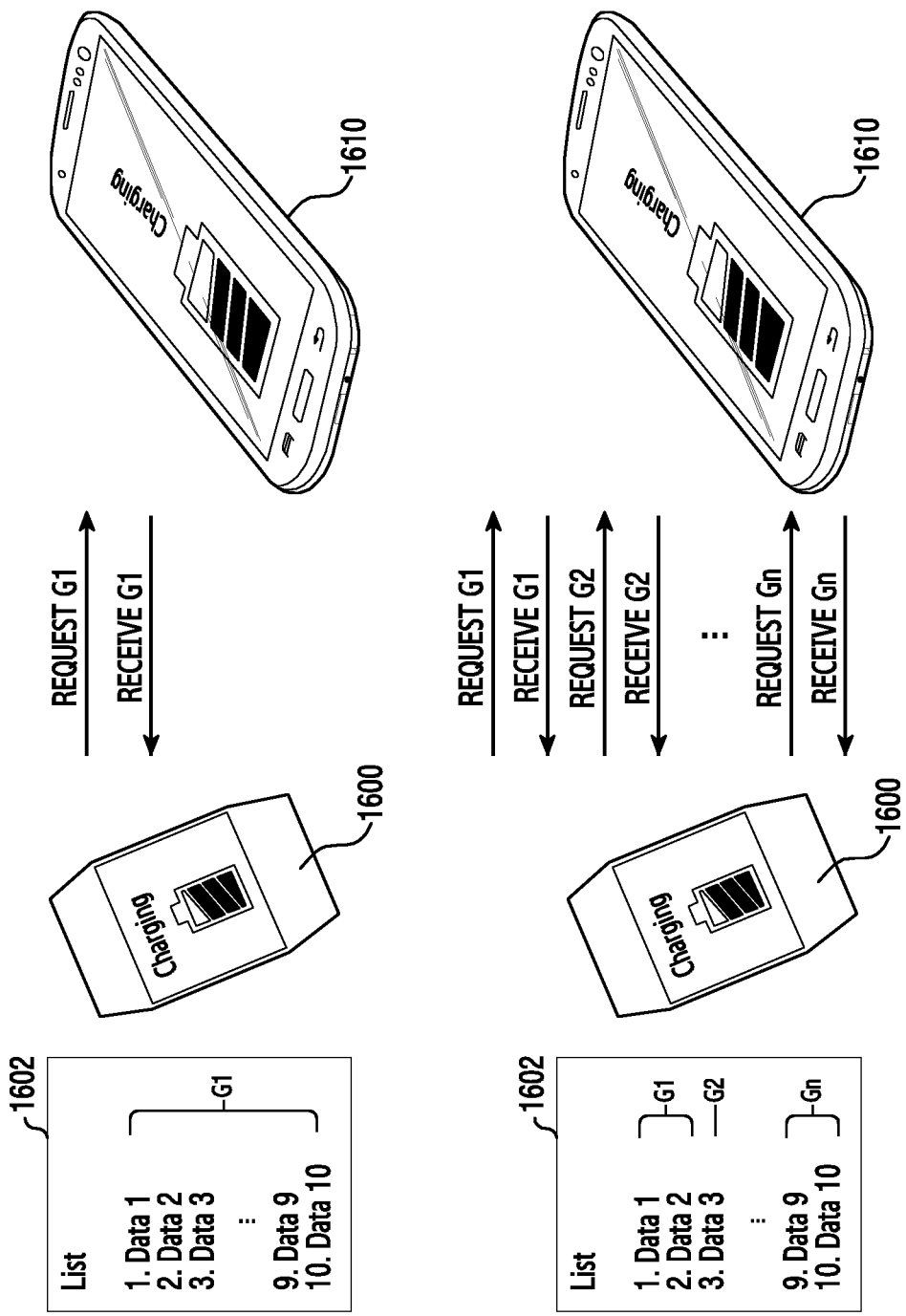
FIG. 16 is a diagram illustrating a situation in which a first electronic device and a second electronic device share data, according to an embodiment of the present invention.

FIG. 16 is a diagram illustrating a situation in which a first electronic device and a second electronic device share data, according to an embodiment of the present invention.

A first electronic device 1600 requests sharing data from a second electronic device 1610 according to a satisfaction of a data sharing operation execution condition.

The first electronic device 1600 may define a time of requesting data desired to be shared, a time interval, and the like. The first electronic device 1600 requests data based on a temperature of the first electronic device 1600. For example, when the first electronic device 1600 requests 10 elements of data 1602 from the second electronic device 1610 and detects a temperature of the first electronic device 1600 that less than a threshold value, the first electronic device 1600 requests the 10 elements of data included in a list from the second electronic device 1610 at one time and receives the data in response to the request, as shown in the top half of FIG. 16.

When the first electronic device 1600 requests 10 elements of data 1602 from the second electronic device 1610 and detects a temperature of the first electronic device that is less than a threshold value, the first electronic device 1600 requests the 10 elements of data included in a list from the second electronic device 1610 at a predetermined time interval and receives the data in response to the request. For example, the first electronic device 1600 may define two elements of data as a first request group, and request and receive data corresponding to the first group. Then, the first electronic device 1600 may stand by for a pre-defined time (for example, 10 seconds) and then request and receive data corresponding to a next group according to a heating degree, as shown in the bottom half of FIG. 16.

Figure 17:
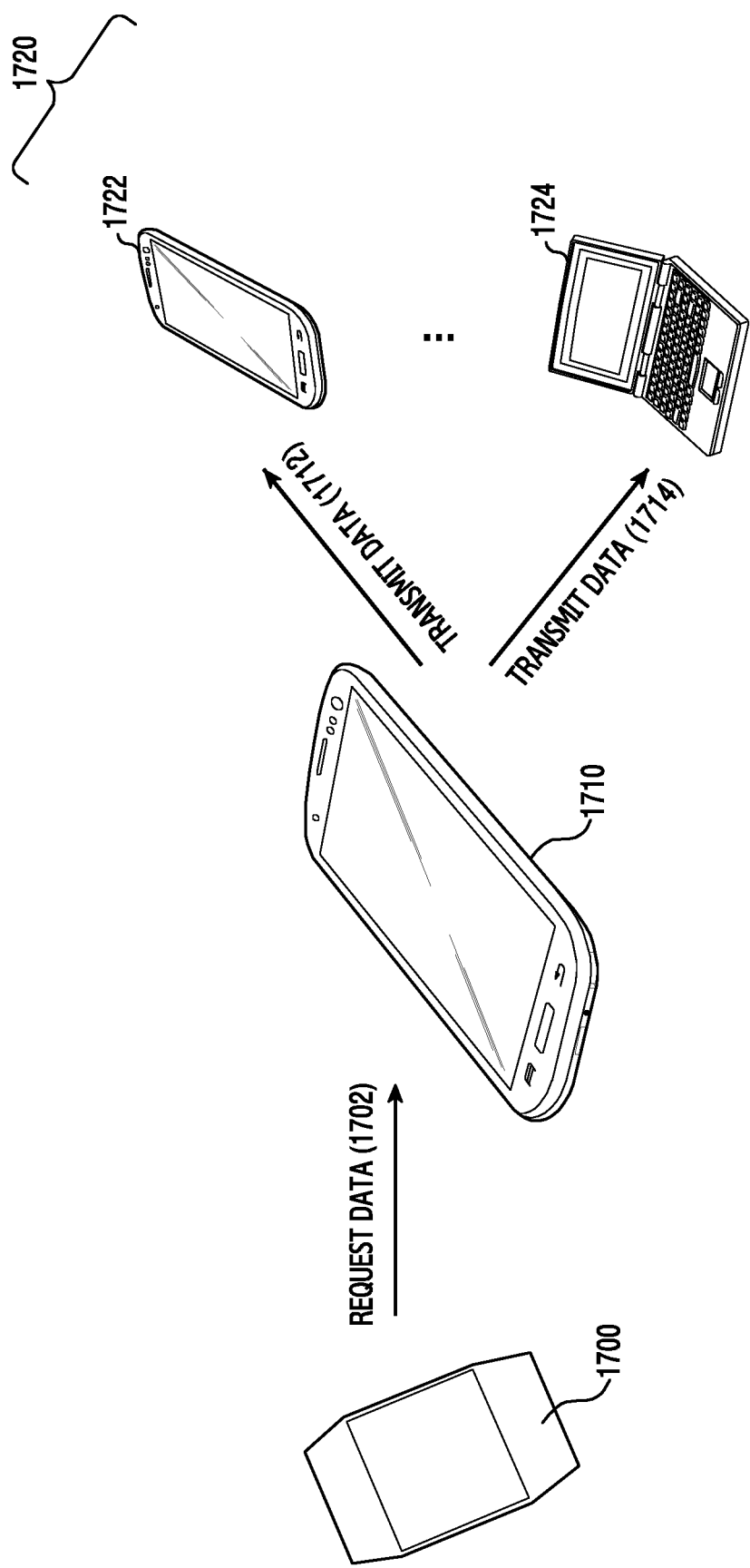
FIG. 17 is a diagram illustrating a situation in which a first electronic device and a second electronic device share data, according to an embodiment of the present invention.

FIG. 17 is a diagram illustrating a situation in which a first electronic device and a second electronic device share data, according to an embodiment of the present invention.

A first electronic device 1700 requests sharing data from a second electronic device 1710 according to a satisfaction of a data sharing operation execution condition (as indicated by reference number 1702).

The second electronic device 1710 provides the first electronic device 1700 with the sharing data corresponding to the request.

The second electronic device 1710 provides a third electronic device, as indicated by reference number 1720, with the sharing data corresponding to the request of the first electronic device 1700. The third electronic device 1720 may be another electronic device (for example, a mobile communication terminal 1722, a PC or laptop 1724, a server, and a media player) communication-connected with the second electronic device 1710. When the third electronic device 1720 satisfies a condition for executing data sharing, the second electronic device 1710 transmits the sharing data corresponding to the request of the first electronic device 1700 to the third electronic device 1720, as indicated by reference numbers 1712 and 1714. When the third electronic device 1720 is operated with external power, instead of a battery, the second electronic device 1710 may also transmit the sharing data to the third electronic device 1720 regardless of the condition for executing data sharing.

According to various exemplary embodiments, an operation method of a first electronic device may include an operation of requesting a data list from a second electronic device based on the detection of a state of charge of a battery of the first electronic device, an operation of receiving the data list from the second electronic device in response to the request and selecting one or more elements of data, and an operation of requesting the selected data from the second electronic device and receiving the requested data.

According to various exemplary embodiments, one or more elements of data may be selected based on the data stored in the first electronic device and the data list received from the second electronic device.

According to various exemplary embodiments, one or more elements of data may be selected based on information associated with at least one of a data storage space, a data reproduction pattern, and context awareness.

According to various exemplary embodiments, an operation of requesting the selected data from the second electronic device and receiving the requested data may include an operation of requesting some data among the selected data from the second electronic device based on heat of the first electronic device, and requesting the remaining data from the second electronic device after a predetermined time.

According to various exemplary embodiments, the method may include an operation of detecting a state of charge of a battery of the first electronic device based on a first communication method, and then performing a connection with the second electronic device based on a second communication method.

According to various exemplary embodiments, the method may include an operation of requesting the selected data from the second electronic device so that the selected data is transmitted to a third electronic device.

According to various exemplary embodiments, an operation method of the second electronic device may include an operation of transmitting a data list of the second electronic device to the first electronic device based on a state of the second electronic device in response to the request of the first electronic device for the data list, and an operation of transmitting data to the first electronic device in response to the request of the first electronic device.

According to various exemplary embodiments, when the second electronic device receives the request for the data based on the first communication method, the second electronic device performs a second communication connection with the first electronic device before transmitting data to the first electronic device, and when the second electronic device is connected with the first electronic device based on the second communication connection, the second electronic device transmits the data based on the second communication connection, and when the second electronic device is not connected with the first electronic device based on the second communication connection, the second electronic device transmits the data based on the first communication.

According to various exemplary embodiments, the method may include an operation of transmitting the data list based on a satisfaction of at least one condition among a condition that the second electronic device is being charged, a condition that a battery is in a charged state with a threshold value or more, and a condition that a battery is in a chargeable state.

According to various exemplary embodiments, the operation may include an operation of transmitting transmit the data list based on that a movement of the second electronic device satisfies a condition.

According to various exemplary embodiments, the method may include an operation of transmitting data corresponding to the request of the first electronic device to the third electronic device.

The control method and the electronic device processing the same according to various exemplary embodiments may receive a data list from a second electronic device based on a detection of a state of charge of a battery of a first electronic device, and request one or more elements of data from the second electronic device in response to the reception of the data list, thereby improving data sharing performance.

While the present invention has been shown and described with reference to certain embodiments thereof, it should be understood by those skilled in the art that many variations and modifications of the method and apparatus described herein will still fall within the spirit and scope of the present invention as defined in the appended claims and their equivalents.

What is claimed is:

1. A wearable device, comprising:
a memory configured to store instructions;
communication circuitry; and
a processor, coupled with the memory and the communication circuitry, configured execute the stored instructions to:
identify that a level of a battery of the wearable device is greater than or equal to a designated value when the battery of the wearable device is not being charged;
identify that a storable capacity of the memory is less than a total capacity of music files that a smart phone associated with the wearable device is capable of transmitting to the wearable device, wherein the music files are stored in the smart phone;
transmit information indicating that the level of the battery of the wearable device is greater than or equal to the designated value when the battery of the wearable device is not being charged, and that the storable capacity of the memory of the wearable device is less than the total capacity of the music files that the smart phone is capable of transmitting to the wearable device; and
receive, from the smart phone, at least one music file that is selected among the music files by the smart phone when the storable capacity of the memory of the wearable device is less than the total capacity of the music files while the level of battery of the wearable device is greater than or equal to the designated value when the battery of the wearable device is not being charged, using the communication circuitry.

2. The wearable device of claim 1, wherein the processor is further configured to execute the stored instructions to:
transmit, to the smart phone, a signal requesting a playlist;
receive, from the smart phone, a signal comprising the playlist which comprises information for indicating the music files that the smart phone is capable of transmitting to the wearable device; and
identify that the storable capacity of the memory is less than the total capacity of the music files based on the signal comprising the playlist.

3. The wearable device of claim 1, wherein the processor is further configured to execute the stored instructions to:
transmit the information to the smart phone via a Bluetooth™ communication path, and
receive the at least one music file from the smart phone via a wireless fidelity communication path.

4. The wearable device of claim 3, wherein the processor is further configured to execute the stored instructions to:
 establish, with the smart phone, the wireless fidelity communication path after transmitting the information to receive the at least one music file via the Bluetooth™ communication path from the smart phone.

5. The wearable device of claim 1, wherein each of the at least one music file corresponds to a music file which is recently represented in the smart phone.

6. The wearable device of claim 1, wherein each of the at least one music file corresponds to a music file which is selected based on a user pattern by the smart phone, wherein the user pattern includes information associated with at least one of a reproduction time of the music file, a reproduction place of the music file, and a reproduction frequency of the music file.

7. The wearable device of claim 1, wherein the at least one music file is transmitted, from the smart phone to the wearable device, based on activating a function for sharing the music file in the smart phone.

8. The wearable device of claim 7, wherein the function is activated by a designated user input on the smart phone.

9. The wearable device of claim 1, wherein the processor is further configured to execute the stored instructions to:
 identify that a temperature of the wearable device is greater than a threshold;
 based on identifying that the temperature of the wearable device is greater than the threshold, request, to the smart phone, to transmit a portion of the at least one music file at a first timing; and
 request, to the smart phone, to transmit a remaining portion of the at least one music file after a designated time is elapsed from the first timing.

10. The wearable device of claim 9, wherein the processor is further configured to execute the stored instructions to:
 receive, from the smart phone, the portion of the at least one music file; and
 receive, from the smart phone, the remaining portion of the at least one music file.

11. A smart phone comprising:
 a memory configured to store instructions;
 communication circuitry; and
 at least one processor, coupled with the memory and the communication circuitry, configured to execute the stored instructions to:
 receive, from a wearable device associated with the smart phone, information indicating that a level of a battery of the wearable device is greater than or equal to a designated value when the battery of the wearable device is not being charged, and that a storable capacity of a memory of the wearable device is less than a total capacity of music files that the smart phone is capable of transmitting to the wearable device, wherein the music files are stored in the smart phone;
 select at least one music file among the music files when the storable capacity of the memory of the wearable device is less than the total capacity of the music files while the level of battery of the wearable device is greater than or equal to the designated value when the battery of the wearable device is not being charged; and
 transmit, to the wearable device, the at least one music file, using the communication circuitry.

12. The smart phone of claim 11, wherein the processor is further configured to execute the stored instructions to:
 receive, from the wearable device, a signal requesting a playlist; and
 transmit, to the wearable device, a signal comprising the playlist which comprises information for indicating the music files that the smart phone is capable of transmitting to the wearable device for the wearable device to identify that the storable capacity of the memory is less than the total capacity of the music files based on the signal comprising the playlist.

13. The smart phone of claim 11, wherein the processor is further configured to execute the stored instructions to:
 receive the information from the wearable device via a Bluetooth™ communication path, and
 transmit the at least one music file to the wearable device via a wireless fidelity communication path.

14. The smart phone of claim 13, wherein the processor is further configured to execute the stored instructions to:
 establish, with the smart phone, the wireless fidelity communication path after receiving the information to transmit the at least one music file via the Bluetooth™ communication path to the wearable device.

15. The smart phone of claim 11, wherein each of the at least one music file corresponds to a music file which is recently represented in the smart phone.

16. The smart phone of claim 11, wherein each of the at least one music file corresponds to a music file which is selected based on a user pattern by the smart phone, wherein the user pattern includes information associated with at least one of a reproduction time of the music file, a reproduction place of the music file, and a reproduction frequency of the music file.

17. The smart phone of claim 11, wherein the at least one music file is transmitted, from the smart phone to the wearable device, based on activating a function for sharing the music file in the smart phone.

18. The smart phone of claim 17, wherein the function is activated by a designated user input on the smart phone.

19. The smart phone of claim 11, wherein the processor is further configured to execute the stored instructions to:
 receive, from the wearable device, a first request to transmit a portion of the at least one music file at a first timing; and
 in response to the first request, transmit to the wearable device, the portion of the at least one music file.

20. The smart phone of claim 19, wherein the processor is further configured to execute the stored instructions to:
 receive, from the wearable device, a second request to transmit a remaining portion of the at least one music file at a second timing; and
 in response to the second request, transmit to the wearable device, the remaining portion of the at least one music file.

* * * * *